United States Patent
Kawanabe

(10) Patent No.: US 6,459,229 B1
(45) Date of Patent: Oct. 1, 2002

(54) MOTOR CONTROL APPARATUS

(75) Inventor: Tetsuya Kawanabe, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/706,734

(22) Filed: Nov. 7, 2000

(30) Foreign Application Priority Data

Nov. 8, 1999 (JP) .......................................... 11-316206

(51) Int. Cl.$^7$ ................................................ H02P 8/00
(52) U.S. Cl. ..................................... 318/696; 400/283
(58) Field of Search ............................... 318/138, 561, 318/570, 571, 573, 685, 696, 603, 618, 567; 369/44.28, 32, 44.29, 44.27, 44.25, 44.34; 400/76, 279, 283, 70, 61

(56) References Cited

U.S. PATENT DOCUMENTS

| | | | | |
|---|---|---|---|---|
| 3,952,238 A | * | 4/1976 | Cutler .......................... | 318/561 |
| 4,066,941 A | * | 1/1978 | Foster .......................... | 318/603 |
| 4,691,154 A | * | 9/1987 | Sato et al. ................... | 318/567 |
| 5,530,332 A | * | 6/1996 | Rees ........................... | 318/260 |
| 5,623,464 A | * | 4/1997 | Tani ........................... | 369/30.17 |
| 5,892,742 A | * | 4/1999 | Yamashita et al. ....... | 369/44.27 |
| 5,896,354 A | * | 4/1999 | Yamashita et al. ....... | 369/44.29 |
| 6,008,609 A | * | 12/1999 | Sawashima et al. ........ | 318/569 |
| 6,127,792 A | * | 10/2000 | Kamiya et al. ............. | 318/432 |
| 6,139,205 A | * | 10/2000 | Suzuki et al. ............... | 400/279 |

\* cited by examiner

*Primary Examiner*—Jeffrey Donels
(74) *Attorney, Agent, or Firm*—Fitzpatrick, Cella, Harper & Scinto

(57) ABSTRACT

A motor control apparatus for outputting the excitation signal of a stepper motor to drive the stepper motor includes a unit for specifying the driving current of the motor, and a determination unit for determining the driving mode of the stepper motor. Driving modes include at least an acceleration mode and a deceleration mode. The motor control apparatus further includes a unit for specifying a driving current according to each driving mode, and a unit for suppressing the driving current near the start of the acceleration mode and near the end of the deceleration mode. The motor control apparatus drives the stepper motor at a high speed in a low noise with a low cost, and prevents wasteful motor heating.

38 Claims, 11 Drawing Sheets

FIG. 7

| N1 | | |
|---|---|---|
| N2 | | |
| TH1 | PHA1 | PHB1 |
| TH2 | PHA2 | PHB2 |

| T1011 | T1012 | T1013 | T1014 | T1015 | T1016 |
|---|---|---|---|---|---|
| T1021 | T1022 | T1023 | T1024 | T1025 | T1026 |
| T1031 | T1032 | T1033 | T1034 | T1035 | T1036 |
| --- | --- | --- | --- | --- | --- |
| T1191 | T1192 | T1193 | T1194 | T1195 | T1196 |
| T1201 | T1202 | T1203 | T1204 | T1205 | T1206 |

| T2011 | T2012 | T2013 | T2014 | T2015 | T2016 |
|---|---|---|---|---|---|
| T2021 | T2022 | T2023 | T2024 | T2025 | T2026 |
| --- | --- | --- | --- | --- | --- |
| T2181 | T2182 | T2183 | T2184 | T2185 | T2186 |
| T2191 | T2192 | T2193 | T2194 | T2195 | T2196 |
| T2201 | T2202 | T2203 | T2204 | T2205 | T2206 |

| P1A01 | P1A02 | P1A03 | P1A04 | P1A05 | P1A06 |
|---|---|---|---|---|---|
| P1A07 | P1A08 | P1A09 | P1A10 | P1A11 | P1A12 |
| P1B01 | P1B02 | P1B03 | P1B04 | P1B05 | P1B06 |
| P1B07 | P1B08 | P1B09 | P1B10 | P1B11 | P1B12 |

| P2A01 | P2A02 | P2A03 | P2A04 | P2A05 | P2A06 |
|---|---|---|---|---|---|
| P2A07 | P2A08 | P2A09 | P2A10 | P2A11 | P2A12 |
| P2B01 | P2B02 | P2B03 | P2B04 | P2B05 | P2B06 |
| P2B07 | P2B08 | P2B09 | P2B10 | P2B11 | P2B12 |

| P3A01 | P3A02 | P3A03 | P3A04 | P3A05 | P3A06 |
|---|---|---|---|---|---|
| P3A07 | P3A08 | P3A09 | P3A10 | P3A11 | P3A12 |
| P3B01 | P3B02 | P3B03 | P3B04 | P3B05 | P3B06 |
| P3B07 | P3B08 | P3B09 | P3B10 | P3B11 | P3B12 |

| P4A01 | P4A02 | P4A03 | P4A04 | P4A05 | P4A06 |
|---|---|---|---|---|---|
| P4A07 | P4A08 | P4A09 | P4A10 | P4A11 | P4A12 |
| P4B01 | P4B02 | P4B03 | P4B04 | P4B05 | P4B06 |
| P4B07 | P4B08 | P4B09 | P4B10 | P4B11 | P4B12 |

| P5A01 | P5A02 | P5A03 | P5A04 | P5A05 | P5A06 |
|---|---|---|---|---|---|
| P5A07 | P5A08 | P5A09 | P5A10 | P5A11 | P5A12 |
| P5B01 | P5B02 | P5B03 | P5B04 | P5B05 | P5B06 |
| P5B07 | P5B08 | P5B09 | P5B10 | P5B11 | P5B12 |

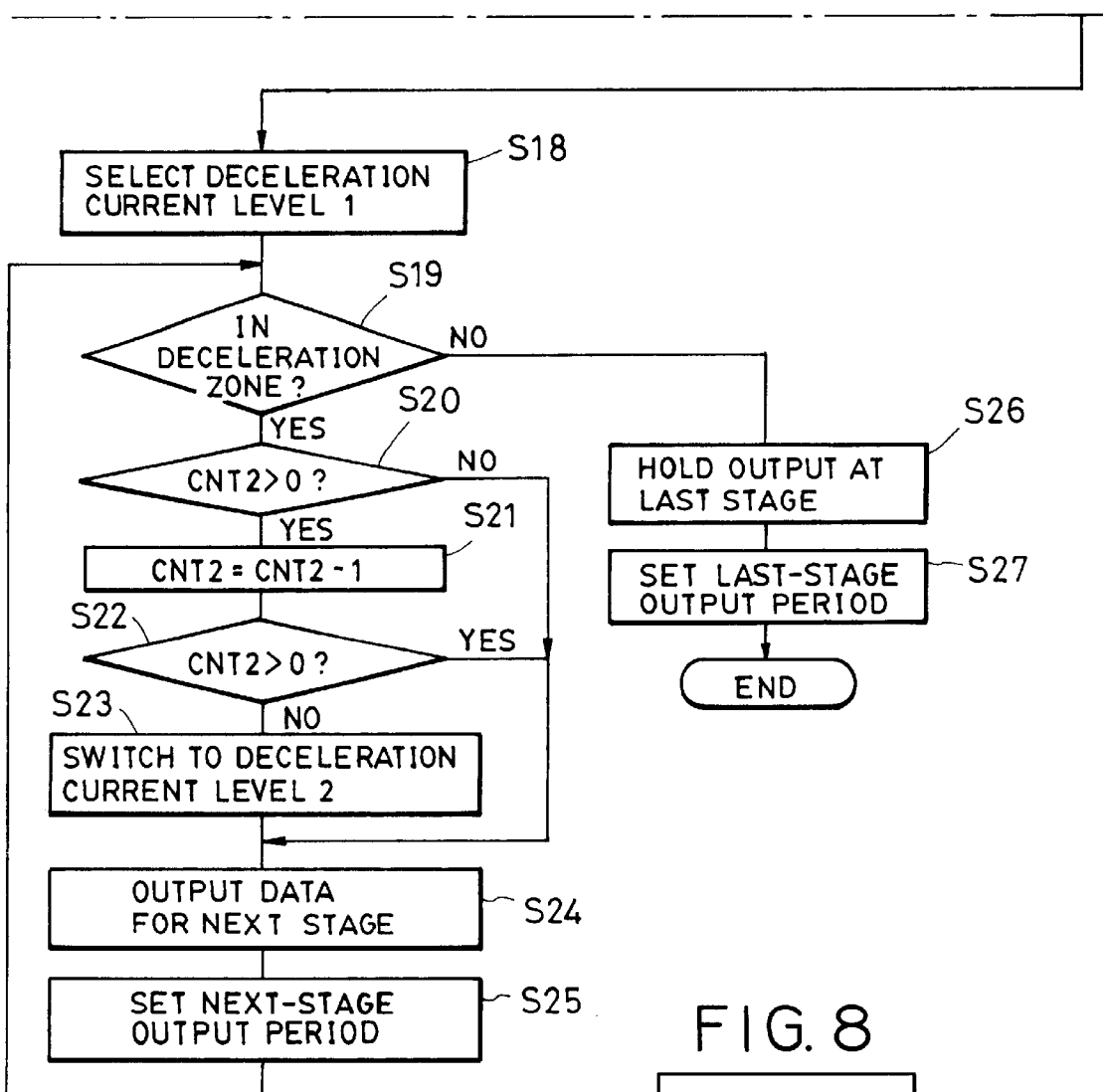

MOTOR CONTROL APPARATUS

BACKGROUND OF THE INVENTION

1. Field of the Invention

The present invention relates to motor control apparatuses for driving motors, such as stepper motors, by switching the excitation phase thereof, and more particularly, to a motor control apparatus having a plurality of operation modes, such as a ramping up/down mode (acceleration driving/deceleration driving), a constant-speed driving mode, and a holding operation mode.

2. Description of the Related Art

A constant-voltage driving method and a constant-current driving method are generally employed for driving stepper motors. The constant-voltage driving method is widely used because the circuit implementing this method has a simple structure and is inexpensive. When the rotation frequency of a motor becomes high, however, the current of a motor winding has a long rising time due to the inductance of the motor winding. Therefore, motor torque is reduced at high-speed rotation to make high-speed rotation impossible.

In the constant-current driving method, the voltage to be applied and the winding inductance are set so as to make the time constant of the motor winding small and the current flowing through the winding is kept constant by switching on and off the current by the use of a switching device, such as a transistor, while the current is being detected, such that the current matches the detected current. When the constant-current driving method is employed, high-speed motor rotation can be performed although the circuit implementing this method has a complicated structure and is expensive. A constant-current driving circuit has been integrated into an IC these days, and therefore, constant-current driving is allowed at a low cost.

When high-speed driving is applied to a stepper motor with the above-described condition, rotation control is generally achieved in control zones, such as an acceleration zone where the motor is accelerated to a target rotation speed, a constant-speed zone where the target rotation speed is maintained, and a deceleration zone where the motor is decelerated and stopped. In the acceleration zone and the deceleration zone, it is necessary to set the rotation torque of the motor higher than in the constant-speed zone in order to change the rotation speed within a relatively short period of time. A method for changing the driving current in the acceleration zone, the constant-speed zone, and the deceleration zone is used.

FIG. 9 and FIG. 10 are views showing the relationship between the target current and the motor winding current in a conventional constant-current driving method. FIG. 9 shows the relationship obtained near the start of the acceleration zone, and FIG. 10 shows the relationship obtained near the end of the deceleration zone. In each figure, the upper part indicates the relationship in phase A of the motor and the lower part indicates the relationship in phase B. A solid line illustrates the target current in each part, and a dotted line illustrates the motor winding current in each part. The maximum winding-current values required to obtain necessary rotation torque in the acceleration zone in the phases are indicated by +IA1, −IA1, +IB1, and −IB1, and the maximum winding-current values required to obtain necessary rotation torque in the deceleration zone in the phases are indicated by +IA2, −IA2, +IB2, and −IB2.

It is understood from FIG. 9 that the rotation frequency increases in the direction from the left to the right in the figure as an acceleration operation is achieved, the winding current flows more than necessary against the target current near the start of acceleration, and the winding current approaches the maximum target winding current as the rotation frequency increases. It is also understood from FIG. 10 that the rotation frequency is reduced in the direction from the left to the right as a deceleration operation is achieved, the winding current is close to the maximum target winding current near the start of deceleration, and the winding current flows more than necessary as the rotation frequency is reduced.

Ideal control can be achieved so that the winding current always matches the target current, by improving the switching characteristic of a driving circuit and by reducing the winding resistance and inductance to improve the response of the current flowing through the winding. To rotate the motor at a high speed, expensive components are required, and the cost of the motor control apparatus increases.

Therefore, as shown in FIG. 9 and FIG. 10, the maximum target current is specified for the motor winding current such that an appropriate rotation torque is generated at a high-rotation-frequency area if high rotation torque is required at acceleration and deceleration. Since the winding current flows more than necessary near the start of acceleration and near the end of deceleration in this method, however, a large-capacity power supply having a large maximum rating is used to drive the motor with the maximum supply current being taken into account. This type of power supply is expensive.

In addition, since the winding current flows more than necessary near the start of acceleration and near the end of deceleration, wasteful motor heat is generated and motor vibration occurs due to wasteful applied rotation torque, and noise also occurs.

SUMMARY OF THE INVENTION

Accordingly, it is an object of the present invention to provide a motor control apparatus for preventing a motor-winding current from flowing more than necessary to allow stable motor rotation.

Another object of the present invention is to suppress the driving current of a stepper motor near the start of an acceleration mode and near the end of a deceleration mode to allow the stepper motor to be rotated at high speed with low cost.

According to one aspect, the present invention that achieves at least one of the foregoing objects relates to a motor control apparatus comprising a stepper motor, driving means, excitation-signal generation means, a timer, pulse generation means, storage means, and control means. The driving means is for driving the stepper motor. The excitation-signal generation means is for applying an excitation signal to the driving means to drive the stepper motor when the excitation signal is switched. The timer is for measuring a predetermined period of time at the end of which the excitation signal is switched. The pulse generation means is for applying a pulse signal having a specified duty cycle to the driving means to control the driving current of the stepper motor. The storage means is for storing motor-control-table information for various driving modes of the stepper motor including at least an acceleration mode and a deceleration mode. The control means is for specifying for the pulse generation means information required for generating a pulse signal having a duty cycle specified according to the motor control-table information of a driving mode. The information includes information used by the driving means to suppress the driving current of the stepper motor near the start of the acceleration mode and near the end of the deceleration mode. The control means is also for controlling the timer to start measuring the predetermined period of time and for controlling the excitation signal generation means to switch the excitation signal at the end of the measured predetermined period of time.

Among the driving modes for which the motor control-table information is stored in the storage means, the acceleration mode has a current-suppression table for acceleration and a normal table for acceleration, and the deceleration mode has a current-suppression table for deceleration and a normal table for deceleration. The control means makes the timer start measuring the predetermined period of time and controls the driving means to drive the stepping motor according to the various driving modes for which the motor control-table information is stored in the storage means, according to the time measured by the timer. The control means controls the driving means to drive the stepping motor according to the driving modes in synchronization with the timing when the excitation signal is switched.

According to another aspect, the present invention that achieves at least one of these objects, relates to a motor control apparatus comprising a stepper motor, driving means, excitation-signal generation means, pulse generation means, storage means, and control means. The driving means is for driving the stepper motor with a driving current. The excitation-signal generation means is for applying an excitation signal to the driving means to drive the stepper motor when the excitation signal is switched. The pulse generation means is for applying a pulse signal having a specified duty cycle to the driving means to control the driving current of the stepper motor. The storage means is for storing motor-control-table information for various driving modes of the stepper motor including at least an acceleration mode, a constant-speed mode, and a deceleration mode. The control means is for specifying for the pulse generation means information required for generating a pulse signal having a duty cycle specified according to the motor control-table information of a driving mode. The information includes information used by the driving means for suppressing the driving current of the stepper motor near the start of the acceleration mode and near the end of the deceleration mode. The control means is also for controlling the excitation-signal generation means to switch the excitation signal.

The stepper motor comprises means for providing a driving source of a carriage control mechanism of a printer. The stepper motor also comprises means for providing high-speed printing for the carriage control mechanism.

According to another aspect, the present invention that achieves at least one of these objects, relates to a motor control apparatus comprising a motor, driving means, excitation-signal generation means, specifying means, storage means, and control means. The driving means is for driving the motor with a driving current. The excitation-signal generation means is for applying an excitation signal to the driving means to drive the motor when the excitation signal is switched. The specifying means is for specifying the driving current supplied to the motor by the driving means. The storage means is for storing motor-control-table information for various driving modes of the motor including at least an acceleration mode and a deceleration mode. The control means is for controlling the specifying means to specify the driving current according to the motor-control-table information of a driving mode, for specifying information used by the driving means for suppressing the driving current of the motor near the start of the acceleration mode and near the end of the deceleration mode, and for controlling the excitation-signal generation means to switch the excitation signal.

According to another aspect, the present invention that achieves at least one of these objects, relates to a motor control apparatus comprising a stepper motor, driving means, excitation-signal generation means, specifying means, storage means, and control means. The driving means is for driving the stepper motor with a driving current. The excitation-signal generation means is for applying an excitation signal to the driving means to drive the stepper motor when the excitation signal is switched. The specifying means is for specifying the driving current supplied to the motor by the driving means. The storage means is for storing motor-control-table information in a motor control table for various driving modes of the stepper motor including at least an acceleration mode and a deceleration mode. The control means is for controlling the specifying means to specify means the driving current according to the motor-control-table information of a driving mode, and for controlling the excitation-signal generation means to switch the excitation signal. The motor control table includes information used by the control means to control the specifying means to specify a driving current corresponding to at least N microsteps within one step driving of the stepper motor, where N is a positive integer. The motor control table includes a current-suppression table for acceleration in the acceleration mode and a normal table for acceleration in the acceleration mode. The motor control table includes a current-suppression table for deceleration in the deceleration mode and a normal table for deceleration in the deceleration mode. The control means controls the specifying means to specify the driving current according to the current-suppression table for acceleration at the start of the acceleration mode. The control means switches the motor control table used for controlling the specifying means after counting the number of microsteps during acceleration. The control means controls the specifying means to specify the driving current according to the normal table for acceleration. The control means controls the specifying means to specify the driving current according to the normal table for deceleration at the start of the deceleration mode. The control means switches the motor control table used for controlling the specifying means after counting the number of microsteps during deceleration. The control means controls the specifying means to specify the driving current according to the current suppression table for deceleration.

According to still another aspect, the present invention that achieves at least one of these objects, relates to a motor control apparatus comprising a stepper motor, driving means, specifying means, and control means. The stepper motor is capable of operating in an acceleration mode and a deceleration mode. The driving means is for driving the stepper motor with a driving current. The excitation-signal generation means is for applying an excitation signal to the driving means to drive the stepper motor when the excitation signal is switched. The specifying means is for specifying the driving current supplied to the stepper motor by the driving means. The control means is for controlling the specifying means to specify the driving current according to a driving mode of the stepper motor, and for controlling the excitation-signal generation means to switch the excitation signal. The control means controls the specifying means so as to suppress the driving current of the stepper motor near the start of an acceleration mode and near the end of a deceleration mode.

According to still another aspect, the present invention that achieves at least one of these objects relates to a motor control apparatus for outputting an excitation signal to a stepper motor to drive the stepper motor in driving modes including an acceleration mode and a deceleration mode. The apparatus comprises means for specifying a driving current of the stepper motor according to each driving mode, determination means for determining the driving mode of the stepper motor, and means for suppressing the driving current near the start of the acceleration mode and near the end of the deceleration mode.

According to still another aspect, the present invention that achieves at least one of these objects relates to a motor control apparatus for outputting an excitation signal of a stepper motor to drive the stepper motor in driving modes including an acceleration mode and a deceleration mode, comprising means for specifying a driving current of the motor according to each driving mode, determination means for determining the driving mode of the stepper motor, and stepper-motor driving means for driving the stepper motor according to a microstep driving method driving the stepper motor in microsteps within one step driving of the stepper motor. The stepper-motor driving means comprises means for specifying the driving current of the stepper motor at least N times within one step driving of the stepper motor, where N is a positive integer. The apparatus further comprises means for counting the number of microsteps of the stepper motor during the acceleration mode from the start of the acceleration mode, and means for counting the number of microsteps of the stepper motor during the deceleration mode from the start of the deceleration mode. In addition, the apparatus also comprises means for achieving driving of the stepping motor at a first maximum target driving current or less at the start of the acceleration mode, means for switching the driving of the stepping motor to a second maximum target driving current or less after the number of microsteps performed during the acceleration mode reaches a predetermined number, means for achieving driving of the stepping motor at a third maximum target driving current or less at the start of the deceleration mode, and means for switching the driving of the stepping motor to a fourth maximum target driving current or less after the number of microsteps performed during the deceleration mode reaches a predetermined number. The apparatus also comprises timer measuring means for measuring a predetermined period of time at the end of which the driving of the stepper motor is switched, means for selecting motor-driving control information including time information of the predetermined time measured by the timer measuring means and target driving current information for each microstep driving, according to a target driving speed, wherein the motor-driving control information is stored in a memory, and means for sequentially reading the time information from the memory to set it for the timer measuring means and for reading the target driving current information from the memory to achieve motor driving control with the two switching means and the two achieving means using the read target driving current information. The motor-driving control information includes microstep information used in the acceleration mode by the first-maximum-target-driving-current achieving means until the maximum target current is switched by the second-maximum-target-driving-current switching means. The motor-driving control information includes microstep information used in the deceleration mode by the third-maximum-target-driving-current achieving means until the maximum target current is switched by the fourth-maximum-target-current switching means.

According to still another aspect, the present invention that achieves at least one of these objects relates to a motor control apparatus for outputting an excitation signal to a stepper motor to drive the stepper motor in driving modes including an acceleration mode and a deceleration mode. The apparatus comprises means for specifying a driving current of the stepper motor, determination means for determining the driving mode of the stepper motor, first target-current specifying means for specifying a target current corresponding to a motor winding current near the start of the acceleration mode and near the end of the deceleration mode, and second target-current specifying means for specifying a target current more than the motor winding current near the start of the acceleration mode and near the end of the deceleration mode.

According to yet another aspect, the present invention that achieves at least one of these objects relates to a motor control apparatus comprising a stepper motor, a motor driving circuit, an excitation-signal generation circuit, a timer circuit, a pulse modulator unit, a memory, and a processor. The motor driving circuit is connected to the stepper motor and drives the stepper motor. The excitation-signal generation circuit is connected to the motor driving circuit and applies an excitation signal to the motor driving circuit to drive the stepper motor when the excitation signal is switched. The timer circuit is connected to the excitation signal generation circuit and measures a predetermined period of time at the end of which the excitation signal is switched. The pulse modulator unit is connected to the motor driving circuit and applies a pulse signal having a specified duty cycle to the motor driving circuit control the driving current of the stepper motor. The memory stores motor-control-table information for various driving modes of the stepper motor including at lease an acceleration mode and a deceleration mode. The processor is connected to the memory, the pulse modulator circuit, the timer circuit, and the excitation-signal generation circuit. The processor specifies the pulse modulator unit information required for generating a pulse signal having a duty cycle specified according to the motor control-table information of a driving mode. The information includes information used by the motor driving circuit to suppress the driving current of the stepper motor near the start of the acceleration mode and near the end of the deceleration mode. The processor controls the timer to start measuring the predetermined period of time. The processor controls the excitation-signal generation circuit to switch the excitation signal at the end of the measured predetermined period of time.

Among the driving modes for which the motor control-table information is stored in the memory, the acceleration mode has a current-suppression table for acceleration and a normal table for acceleration, and the deceleration mode has a current-suppression table for deceleration and a normal table for deceleration. In addition, the processor makes the timer circuit start measuring the predetermined period of time and controls the motor driving circuit to drive the stepping motor according to the various driving modes for which the motor control-table information is stored in the memory, according to the time measured by the timer circuit. The processor controls the motor driving circuit to drive the stepping motor according to the driving modes in synchronization with the timing when the excitation signal is switched.

According to yet another aspect, the present invention that achieves at least one of these objects relates to a motor control apparatus comprising a motor driving circuit, an excitation-signal generation circuit, a pulse modulator unit, a memory, and a processor. The motor driving circuit is connected to the stepper motor and drives the stepper motor with a driving current. The excitation-signal generation circuit is connected to the motor driving circuit and applies an excitation signal to the motor driving circuit to drive the stepper motor when the excitation signal is switched. The pulse modulator unit is connected to the motor driving circuit and applies a pulse signal having a specified duty cycle to the motor driving circuit to control the driving current of the stepper motor. The memory stores motor-control-table information for various driving modes of the stepper motor including at least an acceleration mode, a constant-speed mode, and a deceleration mode. The processor is connected to the memory, the pulse modulator unit, and excitation-signal generation unit, and the motor driving unit. The processor specifies for the pulse modulator unit information required for generating a pulse signal having a duty cycle specified according to the motor control-table information of a driving mode. The information includes information used by the motor driving circuit for suppressing the driving current of the stepper motor near the start of the acceleration mode and near the end of the deceleration mode. The processor controls the excitation-signal generation circuit to switch the excitation signal. The stepper motor provides a driving source of a carriage control mechanism of a printer. In addition, the stepper motor provides high-speed printing for the carriage control mechanism.

According to yet another aspect, the present invention that achieves at least one of these objects relates to a motor control apparatus comprising a motor, a motor driving circuit connected to the motor and driving the motor with a driving current, an excitation-signal generation circuit connected to the motor driving circuit and applying an excitation signal to the motor driving circuit to drive the motor when the excitation signal is switched, a modulator unit connected to the motor driving circuit and specifying the driving current supplied to the motor by the motor driving circuit, a memory storing motor-control-table information for various driving modes of the motor including at least an acceleration mode and a deceleration mode, and a processor connected to the memory, the modulator unit, the excitation-signal generation circuit, and the motor driving circuit and controlling the modulator unit to specify the driving current according to the motor-control-table information of a driving mode. The processor specifies information used by the motor driving circuit for suppressing the driving current of the motor near the start of the acceleration mode and near the end of the deceleration mode. The processor controls the excitation-signal generation circuit to switch the excitation signal.

According to yet another aspect, the present invention that achieves at least one of these objects relates to a motor control apparatus comprising a stepper motor, a motor driving circuit connected to the stepper motor and driving the stepper motor with a driving current, an excitation-signal generation circuit connected to the motor driving circuit and applying an excitation signal to the motor driving circuit to drive the stepper motor when the excitation signal is switched, a modulator unit connected to the motor driving circuit and specifying the driving current supplied to the motor by the motor driving circuit, a memory storing motor-control-table information in a motor control table for various driving modes of the stepper motor including at least an acceleration mode and a deceleration mode, and a processor connected to the memory, the modulator unit, the excitation-signal generation circuit, and the motor driving circuit and controlling the modulator unit to specify the driving current according to the motor-control-table information of a driving mode. The processor controls the excitation-signal generation circuit to switch the excitation signal. The motor control table includes information used by the processor to control the modulator unit to specify a driving current corresponding to at least N microsteps within one step driving of the stepper motor, wherein N is a positive integer. The motor control table includes a current-suppression table for acceleration in the acceleration mode and a normal table for acceleration in the acceleration mode. The motor control table includes a current-suppression table for deceleration in the deceleration mode and a normal table for deceleration in the deceleration mode. The processor controls the modulator unit to specify the driving current according to the current-suppression table for acceleration at the start of the acceleration mode. The processor switches the motor control table used for controlling the modulator unit after counting the number of microsteps during acceleration. The processor controls the modulator unit to specify the driving current according to the normal table for acceleration. The processor controls the modulator unit to specify the driving current according to the normal table for deceleration at the start of the deceleration mode. The processor switches the motor control table used for controlling the modulator nit after counting the number of microsteps during deceleration. The controller controls the modulator unit to specify the driving current according to the current suppression table for deceleration.

According to yet another aspect, the present invention that achieves at least one of these objects relates to a motor control apparatus comprising a stepper motor capable of operating in an acceleration mode and a deceleration mode, a motor driving circuit connected to the stepper motor and driving the stepper motor with a driving current, an excitation-signal generation circuit connected to the motor driving circuit and applying an excitation signal to the motor driving circuit to drive the stepper motor when the excitation signal is switched, a modulator unit connected to the motor driving circuit and specifying the driving current supplied to the stepper motor by the motor driving circuit, and a processor connected to the modulator unit, the excitation-signal generation circuit, and the motor driving circuit and controlling the modulator unit to specify the driving current according to a driving mode of the stepper motor. The processor controls the excitation-signal generation unit to switch the excitation signal. The processor controls the modulator unit so as to suppress the driving current of the stepper motor near the start of an acceleration mode and near the end of a deceleration mode.

According to yet another aspect, the present invention that achieves at least one of these objects relates to a motor control apparatus for outputting an excitation signal to a stepper motor to drive the stepper motor in driving modes including an acceleration mode and a deceleration mode. The apparatus comprises a modulator unit connected to the stepping motor and specifying a driving current of the stepper motor according to each driving mode and a processor, connected to the modulator unit and to the stepping motor. The processor determines the driving mode of the stepper motor. The processor controls the modulator unit to suppress the driving current near the start of the acceleration mode and the near the end of the deceleration mode.

According to yet another aspect, the present invention that achieves at least one of these objects relates to a motor control apparatus for outputting an excitation signal of a stepper motor to drive the stepper motor in driving modes including an acceleration mode and a deceleration mode.

The apparatus comprises a modulator unit connected to the stepper motor and specifying a driving current of the motor according to each driving mode, a processor connected to the modulator unit and to the stepping motor and determining the driving mode of the stepper motor, and a stepper-motor driving circuit connected to the processor and driving the stepper motor according to a microstep driving method driving the stepper motor in microsteps within one step driving of the stepper motor. The stepper-motor driving circuit specifies the driving current of the stepper motor at least N times within one step driving of the stepper motor, wherein N is a positive integer. The processor counts the number of microsteps of the stepper motor during the acceleration mode from the start of the acceleration mode. The processor counts the number of microsteps of the stepper motor during the deceleration mode from the start of the deceleration mode. The processor controls the modulator unit to cause the modulator unit to achieve driving of the stepping motor at a first maximum target driving current or less at the start of the acceleration mode. The processor controls the modulator unit to switch the driving of the stepping motor to a second maximum target driving current or less after the number of microsteps performed during the acceleration mode reaches a predetermined number. The processor controls the modulator unit to cause the modulator unit to achieve driving of the stepping motor at a third maximum target driving current or less at the start of the deceleration mode. The processor controls the modulator unit to switch the driving of the stepping motor to a fourth maximum target driving current or less after the number of microsteps performed during the deceleration mode reaches a predetermined number. The apparatus also comprises a timer circuit connected to the processor and measuring a predetermined period of time at the end of which the driving of the stepper motor is switched. The processor selecting motor-driving control information including time information of the predetermined time measured by the timer circuit and target driving current information for each microstep driving, according to a target driving speed, wherein the motor-driving control information is stored in a memory. The processor sequentially reads the time information from the memory to set it for the timer circuit and reading the target driving current information from the memory to achieve motor driving control with the modulator unit using the read target driving current information. The motor-driving control information includes microstep information used in the acceleration mode by the processor to achieve the first maximum target driving current until the maximum target current is switched to the second maximum target driving current by the processor. The motor-driving control information includes microstep information used in the deceleration mode by the processor to achieve the third maximum target driving current until the maximum target current is switched to the fourth maximum target driving current by the processor.

According to yet another aspect, the present invention that achieves at least one of these objects relates to a motor control apparatus for outputting an excitation signal to a stepper motor to drive the stepper motor in driving modes including an acceleration mode and a deceleration mode. The apparatus comprises a processor, connected to the stepping motor and specifying a driving current of the stepper motor. The processor determines the driving mode of the stepper motor. The processor specifies a target current corresponding to a motor winding current near the start of the acceleration mode and near the end of the deceleration mode. The processor specifies a target current more than the motor winding current near the start of the acceleration mode and near the end of the deceleration mode.

According to yet another aspect, the present invention that achieves at least one of these objects relates to a method of controlling a stepper motor to be driven in an acceleration mode and a deceleration mode comprising the steps of specifying the duty cycle of a pulse signal suppressing the driving current of the stepper motor near the start of the acceleration mode or the end of the deceleration mode in accordance with stored motor control table information, measuring a predetermined time from the start of the duty cycle of the pulse signal suppressing the driving current of the stepper motor near the start of the acceleration mode or the end of the deceleration mode in accordance with stored motor control table information, switching an excitation signal at the end of the predetermined period of time measured in the measuring step, and specifying a new duty cycle for a pulse signal to change the driving current of the stepper motor when the excitation signal is switched in the switching step in accordance with stored motor control table information.

The first specifying step specifies the duty cycle of the pulse signal suppressing the driving current of the stepping motor near the start of the acceleration mode in accordance with a stored current-suppression table for acceleration. The first specifying step also specifies the duty cycle of the pulse signal suppressing the driving current of the stepping motor near the end of the deceleration mode in accordance with a stored current-suppression table for deceleration. The second specifying step specifies a new duty cycle of the pulse signal to change the driving current of the stepper motor in the acceleration mode in accordance with a stored normal table for acceleration. The second specifying step also specifies a new duty cycle of the pulse signal to change the driving current of the stepper motor in the deceleration mode in accordance with a stored normal table for deceleration.

The method further comprises the step of controlling a driving circuit to drive the stepper motor with a driving current in accordance with the pulse signal whose duty cycle is specified in the specifying steps and in accordance with the time measured in the measuring step. In addition, the controlling step controls the driving circuit to drive the stepping motor according to the driving modes in synchronization with the timing measured in the measuring step when the excitation signal is switched in the switching step.

According to still another aspect, the present invention that achieves at least one of these objects relates to a method of controlling a stepper motor to be driven in an acceleration mode, a constant-speed mode, and a deceleration mode comprising the steps of specifying the duty cycle of a pulse signal determining the driving current of the stepper motor in the acceleration mode, the constant-speed mode, and the deceleration mode in accordance with stored motor control table information, specifying the duty cycle of a pulse signal suppressing the driving current of the stepper motor near the start of the acceleration mode or the end of the deceleration mode in accordance with stored motor control table information, switching an excitation signal, and specifying a new duty cycle for a pulse signal to change the driving current of the stepper motor when the excitation signal is switched in the switching step in accordance with stored motor control table information. The method further comprises the steps of driving a carriage control mechanism of a printer with the stepper motor and driving the carriage control mechanism to control the printer to perform high-speed printing with the stepper motor.

According to still another aspect, the present invention that achieves at least one of these objects relates to a method of controlling a motor to be driven in at least an acceleration mode and a deceleration mode comprising the steps of specifying the driving current of the motor in the acceleration mode and the deceleration mode in accordance with stored motor control table information, suppressing the driving current of the motor near the start of the acceleration mode or the end of the deceleration mode in accordance with stored motor control table information, switching an excitation signal, and specifying a new driving current of the motor when the excitation signal is switched in the switching step in accordance with stored motor control table information.

According to yet another aspect, the present invention that achieves at least one of these objects relates to a method of controlling a stepper motor to be driven in at least an acceleration mode and a deceleration mode in microsteps within one step. The method comprising the steps of specifying the driving current for the stepper motor according to a stored current-suppression table for acceleration at the start of the acceleration mode, counting the number of microsteps performed by the stepper motor when being driven in the acceleration mode, switching the table used for specifying the driving current from the current-suppression table for acceleration to the normal table for acceleration after the number of counted microsteps reaches a predetermined number during acceleration of the stepping motor in the acceleration mode, specifying the driving current for the stepper motor according to the stored normal table for acceleration in the acceleration mode, specifying the driving current for the stepper motor according to a normal table for deceleration at the start of the deceleration mode, counting the number of microsteps performed by the stepper motor when being driven in the deceleration mode, switching the table used for specifying the driving current from the normal table for deceleration in the deceleration mode to a current-suppression table for deceleration in the deceleration mode after the number of counted microsteps reaches a predetermined number during deceleration of the stepping motor in the deceleration mode, and specifying the driving current for the stepper motor according to the current-suppression table for deceleration at the start of the deceleration mode.

According to yet another aspect, the present invention the achieves at least one of these objects relates to a method of controlling a stepper motor to be driven in at least an acceleration mode and a deceleration mode comprising the steps of specifying the driving current of the motor in accordance with the driving mode in which the stepper motor operates, suppressing the driving current of the motor near the start of the acceleration mode and at the end of the deceleration mode, switching an excitation signal, and specifying a new driving current of the motor when the excitation signal is switched in the switching step after the driving current in the acceleration mode is suppressed in the suppressing step and when the driving current in the deceleration mode is suppressed in the suppressing step.

According to still another aspect, the present invention that achieves at least one of these objects relates to a method of controlling a stepper motor to drive the stepper motor in driving modes including an acceleration mode and a deceleration mode, comprising the steps of determining the driving mode in which the stepping motor will next operate, specifying a driving current of the stepper motor according to the driving mode determined in the determining step, and suppressing the driving current near the start of the acceleration mode and near the end of the deceleration mode.

According to yet another aspect, the present invention that achieves at least one of these objects relates to a method of controlling a stepper motor to drive the stepper motor in driving modes including an acceleration mode and a deceleration mode, comprising the steps of determining the driving mode in which the stepper motor will next operate, specifying a driving current of the stepper motor according to the driving mode determined in the determining step, driving the stepper motor according to a microstep driving method driving the stepper motor in microsteps within one step driving of the stepper motor by specifying the driving current of the stepper motor at least N times within one step driving of the stepper motor, wherein N is a positive integer, counting the number of microsteps of the stepper motor during the acceleration mode from the start of the acceleration mode, counting the number of microsteps of the stepper motor during the deceleration mode from the start o the deceleration mode, driving the stepping motor at a first maximum target driving current or less at the start of the acceleration mode, switching the driving of the stepping motor to a second maximum target driving current or less after the number of microsteps counted in the acceleration mode microstep counting step reaches a predetermined number, driving of the stepping motor at a third maximum target driving current or less at the start of the deceleration mode, and switching the driving of the stepping motor to a fourth maximum target driving current or less after the number of microsteps counted in the deceleration mode microstep counting step reaches a predetermined number.

In addition, the method further comprises the steps of measuring a predetermined period of time at the end of which the driving of the stepper motor is switched in one of the switching steps, selecting motor-driving control information from a memory including time information of the predetermined time to be measured by the measuring step and target driving current information for each microstep driving, according to a target driving speed, and sequentially reading the time information from the memory to set it for the measuring step and for reading the target driving current information from the memory to achieve motor driving control with the two switching and driving steps means using the read target driving current information. The first maximum target driving current driving step achieves the first maximum target driving current by using microstep information of the motor-driving control information in the acceleration mode until the maximum target current is switched in the second-maximum-target-driving-current switching step. The third maximum target driving current driving step achieves the third maximum target driving current by using microstep information of the motor-driving control information in the deceleration mode until the maximum target current is switched in the fourth-maximum-target-driving-current switching step.

According to still another aspect, the present invention that achieves at least one of these objects relates to a method of controlling a stepper motor to drive the stepper-motor in driving modes including an acceleration mode and a deceleration mode, comprising the steps of determining the driving mode in which the stepper motor will next operate, specifying a driving current of the stepper motor in accordance with the driving mode determined in the determining step comprising the steps of specifying a target current corresponding to a motor winding current near the start of the acceleration mode and near the end of the deceleration mode, and specifying a target current more than the motor winding current near the start of the acceleration mode and near the end of the deceleration mode.

Further objects, features, and advantages of the present invention will become apparent from the following descrip-

BRIEF DESCRIPTION OF THE DRAWINGS

FIG. 7 is a view of the structure of motor driving control tables stored in a ROM shown in FIG. 6.

DESCRIPTION OF THE PREFERRED EMBODIMENT

Figure 1:
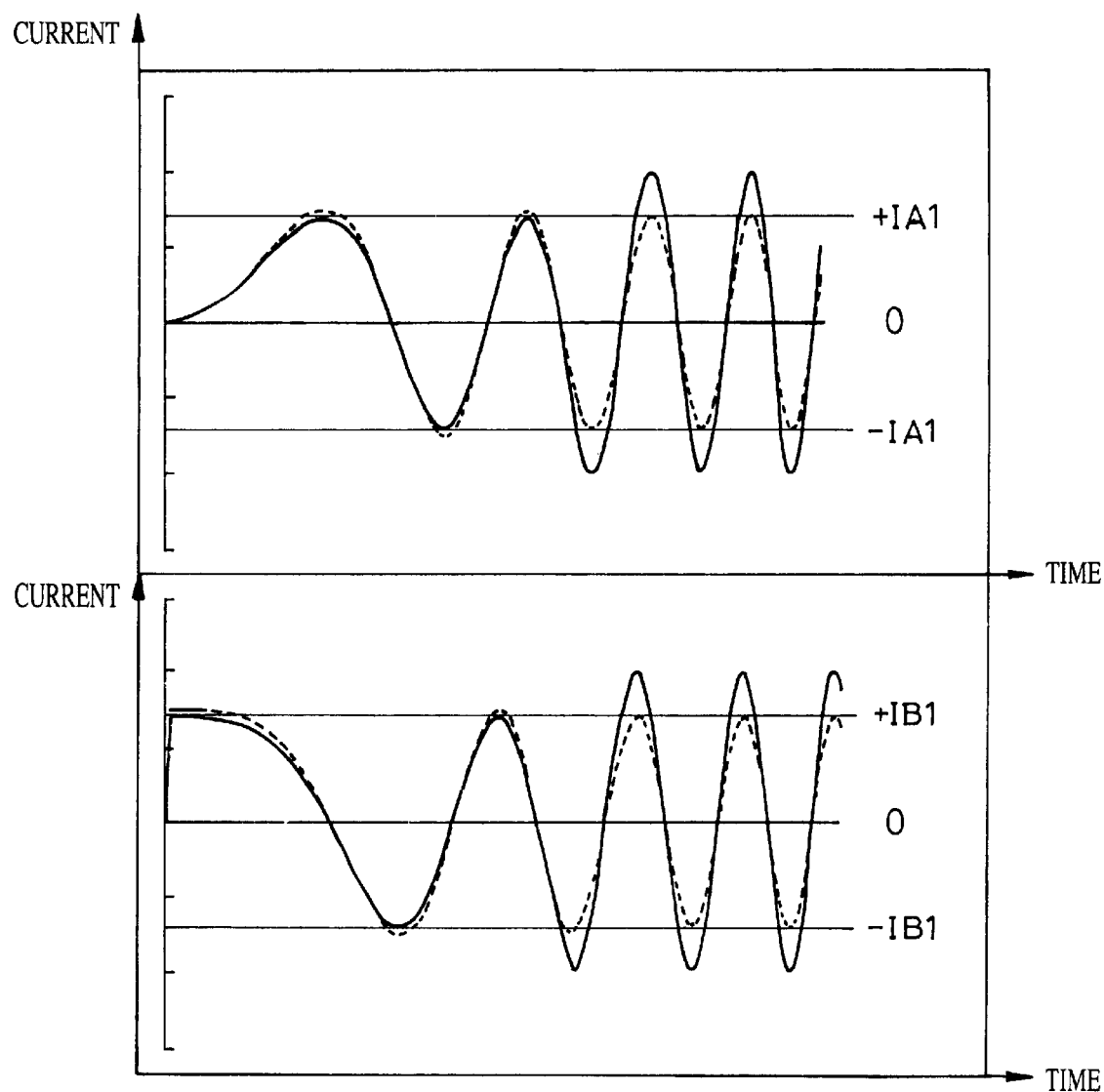
FIG. 1 is a graph of current supplied to the motor over time showing motor driving control achieved near the start of an acceleration zone according to the present invention.

An embodiment of the present invention will be described below by referring to the drawings.

Figure 2:
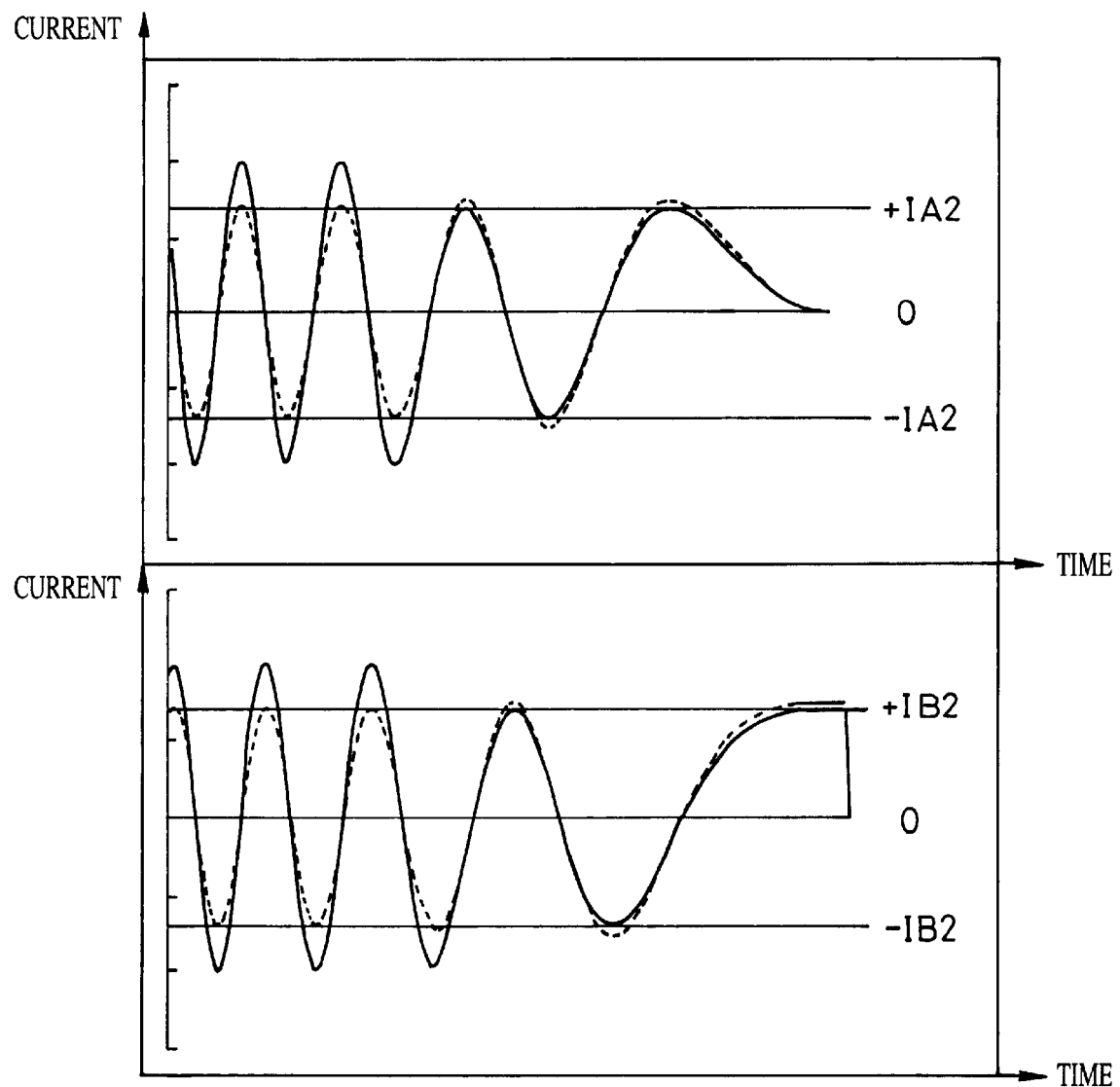
FIG. 2 is a graph of current supplied to the motor over time showing motor driving control achieved near the end of a deceleration zone according to the present invention.

FIG. 1 and FIG. 2 are graphs showing the relationship between a target current and a motor winding current in a bipolar-type constant-current driving method to which the present invention is applied. FIG. 1 shows the relationship obtained near the start of an acceleration zone, and FIG. 2 shows the relationship obtained near the end of a deceleration zone. In each figure, the upper part indicates the relationship in phase A of the motor and the lower part indicates the relationship in phase B. A solid line illustrates the target current in each part, and a dotted line illustrates the motor winding current in each part. The maximum winding-current values required to obtain necessary rotation torque in the acceleration zone in the phases are indicated by +IA1, –IA1, +IB1, and –IB1, and the maximum winding-current values required to obtain necessary rotation torque in the deceleration zone in the phases are indicated by +IA2, –IA2, +IB2, and –IB2.

It is understood from FIG. 1 that the rotation frequency increases in the direction from the left to the right as an acceleration operation is achieved; the target current is reduced near the start of acceleration and the motor is driven by the minimum necessary winding current; and the maximum target current is increased as the rotation frequency increases, in order to assure a winding current value required at a high-speed-rotation range.

It is also understood from FIG. 2 that the rotation frequency is reduced in the direction from the left to the right as a deceleration operation is achieved; the maximum target current is increased near the start of deceleration and the motor is driven by a necessary winding current; and the maximum target current is reduced as the rotation frequency is reduced, in order to stop supplying the winding current more than necessary.

With the above control, since the winding current is suppressed to the minimum necessary level near the start of the acceleration zone and near the end of the deceleration zone, the capacity of the motor power supply is optimized to reduce the motor heat and noise.

Figure 3:
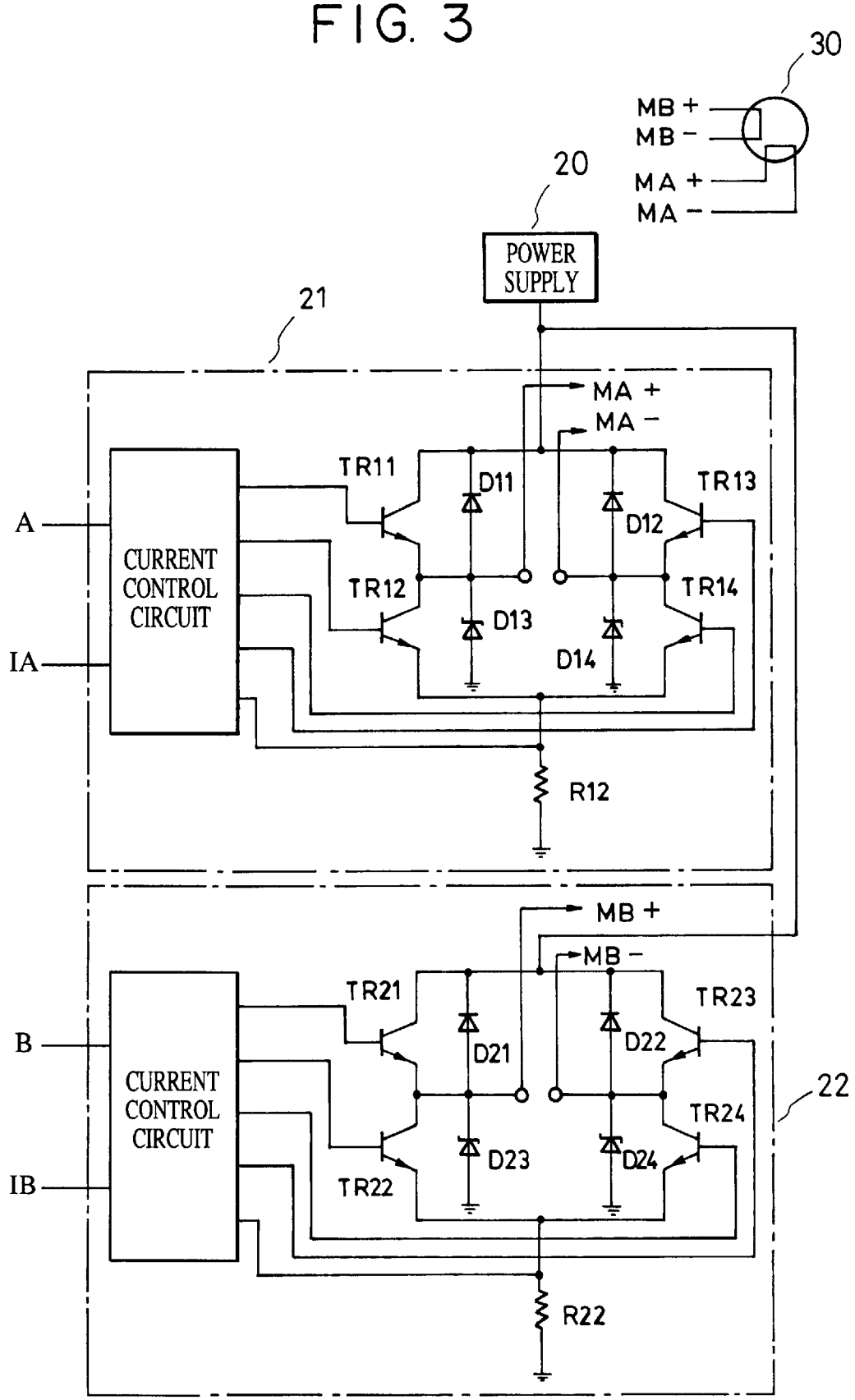
FIG. 3 is a circuit diagram of motor driving circuits according to an embodiment of the present invention.

FIG. 3 is a circuit diagram of motor driving circuits. In FIG. 3, a power supply 20 for driving the motor is connected to motor driving circuits 21 and 22. A stepper motor 30 is formed of two-phase coils. A phase-A coil is connected to MA+ and MA– of the motor driving circuit 21, and a phase-B coil is connected to MB+ and MB– of the motor driving circuit 22.

The motor driving circuit 21 is a bipolar-type constant-current driving circuit for phase A, and the motor driving circuit 22 is a bipolar-type constant-current driving circuit for phase B. They have the same internal structure. A signal input to an input terminal A of the motor driving circuit 21 specifies the direction of a current flowing through the phase-A coil of the motor 30. When the terminal A has an H level, for example, a transistor TR11 is turned on, a transistor TR14 is turned on, transistors TR12 and TR13 are turned off, and a current flows in the direction from MA+ to MA–. When the terminal A has an L level, transistors TR11 and TR14 are turned off and transistors TR12 and TR13 are turned on and the current flows in the direction from MA– to MA+. A signal input to an input terminal IA specifies the target current. A voltage at the terminal corresponds to a target current at a predetermined ratio. When the terminal IA is 3 V, for example, a winding current of 600 mA flows. When the terminal IA is 1.5 V, a winding current of 300 mA flows.

A winding current flowing through the phase-A motor coil is converted to a voltage by a sense resistor R12, and the detected voltage is compared with a target-current-level setting voltage at the terminal IA. When the voltage at the terminal IA is higher, a pair of transistors corresponding to the level of the terminal A is turned on; and when the voltage at the terminal IA is lower, the pair of transistors corresponding to the level of the terminal A is turned off to achieve constant-current driving of the motor.

Diodes D11 to D14 are so-called flywheel diodes. When the pair of transistors TR11 and TR14 are turned off, a current path is formed from the anode of the diode D14 through the coil to the diode D11, through which a current flows due to a counterelectromotive force generated at the coil. When the pair of transistors TR13 and TR12 are turned off, a current path is formed from the anode of the diode D13 through the coil to the diode D12, through which a current flows due to a counterelectromotive force generated at the coil.

A signal input to an input terminal B of the motor driving circuit 22 specifies the direction of a current flowing through the phase-B coil of the motor 30. In the same way as for the terminal A, when the terminal B has an H level, for example, a transistor TR21 is turned on, a transistor TR24 is turned on, transistors TR22 and TR23 are turned off and a current flows in the direction from MB+ to MB–. When the terminal B has an L level, transistors TR21 and TR24 are turned off and transistors TR22 and TR23 are turned on and the current flows in the direction from MB– to MB+. In the same way as for the terminal IA, a signal input to an input terminal IB specifies the target current. A voltage at the terminal corresponds to a target current at a predetermined ratio. A winding current flowing through the phase-B motor coil is converted to a voltage by a sense resistor R22, and the detected voltage is compared with a target-current-level setting voltage at the terminal IB. When the voltage at the terminal IB is higher, a pair of transistors corresponding to the level of the terminal B is turned on; and when the voltage at the terminal IB is lower, the pair of transistors corresponding to the level of the terminal B is turned off to achieve constant-current driving of the motor.

Diodes D21 to D24 are so-called flywheel diodes. When the pair of transistors TR21 and TR24 are turned off, a current path is formed from the anode of the diode D24 through the coil to the diode D21, through which a current flows due to a counterelectromotive force generated at the coil. When the pair of transistors TR23 and TR22 are turned off, a current path is formed from the anode of the diode D23 through the coil to the diode D22, through which a current flows due to a counterelectromotive force generated at the coil.

Motor control according to the present invention is possible when the target currents are sequentially specified as shown in FIG. 1 and FIG. 2 in motor rotation control near the start of the acceleration zone and near the end of the deceleration zone in the circuit configured as described above. In FIG. 1 and FIG. 2, the terminal A and the terminal B are set to an L level during ranges where the target current, indicated by a solid line, is changed from 0 to −IA1, from 0 to −IB1, from 0 to −IA2, and from 0 to −IB2, and the voltages converted from the absolute values of desired target currents are specified at the terminal IA and the terminal IB to achieve driving.

Figure 4:
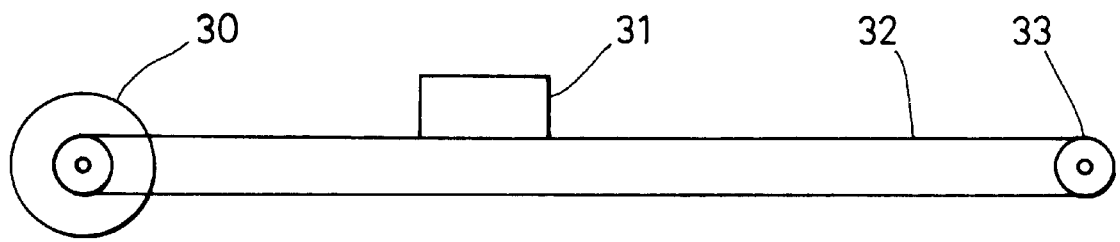
FIG. 4 is a view of a carriage control mechanism that uses the motor shown in FIG. 3.

FIG. 4 is a view showing a carriage control mechanism driven by the motor shown in FIG. 3. This carriage control mechanism is used in an ink-jet printer. In FIG. 4, a stepper motor 30 and a pulley 33 are installed on a printer frame (not shown). A belt 32 is passed through the stepper motor 30 and the pulley 33, and a carriage 31 is installed on the belt 32. When the stepper motor 30 is rotated, the carriage 31 is moved left or right in the figure. A printing head (not shown) is mounted on the carriage 31. Ink is discharged from the printing head while the carriage 31 is moved, to print a desired image on a medium, such as paper, disposed oppositely to the printing head.

Various movement speeds are provided according to the purposes of printing operation modes which include, for example, a high-quality printing mode (standard printing) at an appropriate speed (normal speed), a high-speed printing mode (high-speed printing) for characters, and a maintenance operation mode for wiping the orifice surface of the printing head by a wiper while the carriage 31 is moved at a very low speed.

Figure 5:
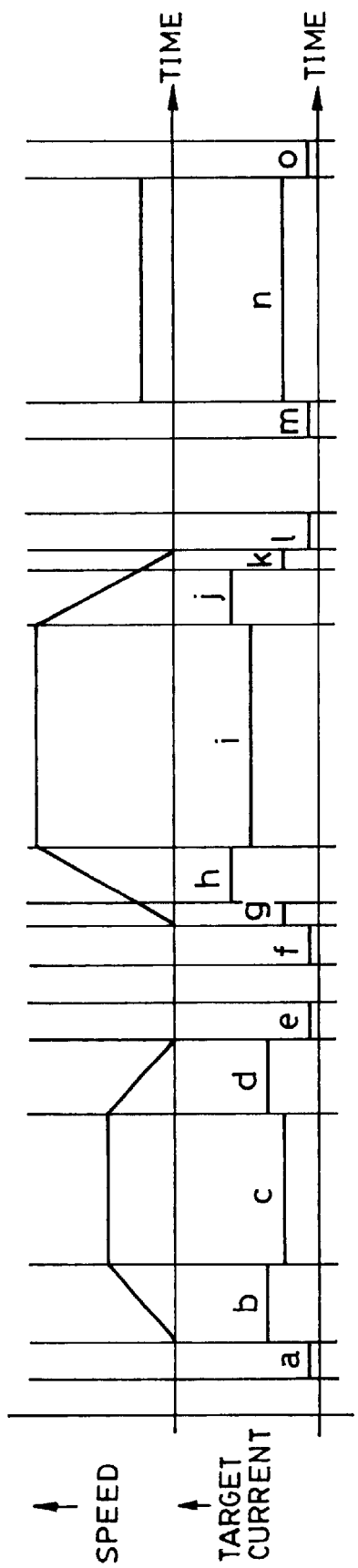
FIG. 5 is a graph of the driving speed and target current over time showing the relationship between the driving speed of the motor shown in FIG. 4 and the target current.

The relationship between the carriage movement speed and the maximum target-current setting for the stepper motor 30 according to each purpose in typical carriage movement control will be described below by referring to FIG. 5. The target current in the figure indicates the maximum target-current setting in each zone. The higher the signal level becomes, the higher the motor winding current is.

In the figure, there are a holding zone "a" before movement, an acceleration zone "b" to the normal speed, a constant-speed zone "c" at the normal speed, a deceleration zone "d" from the normal speed, a holding zone "e" after the movement, a holding zone "f" before another movement, a vicinity "g" of the start of an acceleration zone to the high-speed operation, a high-speed acceleration zone "h," a high-speed operation zone "i," a deceleration start zone "j" from the high-speed operation, a vicinity "k" of the end of the deceleration zone from the high-speed operation, a holding zone "l" after the movement, a holding zone "m" before still another movement, a very-low-speed operation zone "n," and a holding zone "o" after the movement.

In the present embodiment, standard printing is achieved at the normal speed in the zones "a" to "e." Since the motor rotation frequency required for this printing is not very high, the winding current tracks the target current in the acceleration zone "b." Therefore, it is not necessary to reduce the target current near the start of the acceleration. In the same way, since the winding current tracks the target current also in the deceleration zone "d," it is unnecessary to reduce the target current near the end of the deceleration.

High-speed printing is achieved at a high speed in the zones "f" to "l." Since the motor rotation frequency required for this printing is high, a high target current is specified in the zone "h" in order to cause the winding current to positively flow in a high-frequency rotation range. Because the motor rotation frequency is low at the start point of acceleration, a relatively low target current is specified in the zone "g" to prevent an excess winding current from flowing. In the same way, during deceleration, a high target current is specified in the zone "j" in order to cause the winding current to positively flow in a high-frequency rotation range. Because the motor rotation frequency is low near the end of the deceleration, a relatively low target current is specified in the zone "k" to prevent an excess winding current from flowing. The maintenance operation is achieved at a very low speed in the zones "m" to "o." Since this operation is performed at the self-activation frequency of the motor, an acceleration zone or a deceleration zone is not required, and a constant maximum target current flows only in the constant-speed zone "n."

During the above printing operations, the carriage is generally moved in both directions. When the mechanism shown in FIG. 4 is employed, even if the stepper motor 30 starts rotating at the start of carriage movement, especially when the movement direction is changed, a transfer delay is generated until a driving force is applied to the carriage 31 through the belt 32. This is due to so-called backlash caused by an appropriate play required for the transfer mechanism and a transitional droop of the belt during driving in the mechanism in which a gear fit into the shaft of the motor is engaged in the internal teeth of the belt and the belt is carried to move the carriage. Conversely, this means that the load torque applied to the shaft of the motor is small near the start of acceleration.

It is understood that a high winding current is not necessary at the start of acceleration because the load applied to the motor shaft is small at the start. In other words, even if the target motor-rotation frequency is not very high and the winding current sufficiently tracks the target current, when the above mechanism is employed, the target current is suppressed during a transitional zone (near the start of an acceleration zone) at the start of motor rotation to reduce the power consumed when the motor is operated, by applying the present invention. In addition, motor heating can be suppressed. When the above mechanism is employed, a load torque applied to the motor shaft is small also at the end of deceleration in many cases, and the target current is suppressed near the end of the deceleration to reduce the power consumed when the motor is operated.

Figure 6:
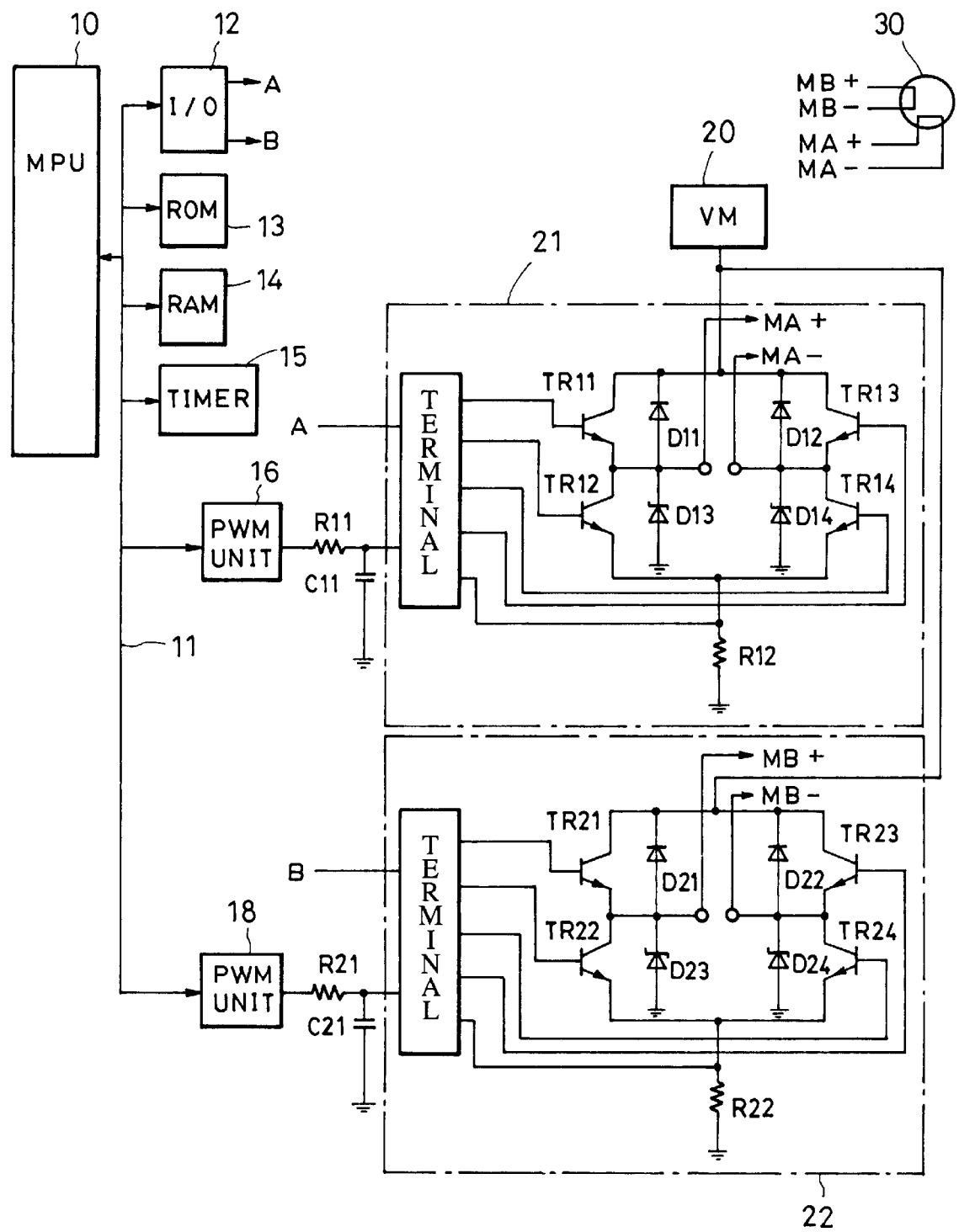
FIG. 6 is a circuit diagram of a motor control circuit for controlling the motor driving circuit shown in FIG. 3.

FIG. 6 is a circuit diagram of a motor control circuit for controlling the motor driving circuits shown in FIG. 3, by using a microprocessor. In FIG. 6, a microprocessing unit (MPU) 10 controls the rotation of the motor. A RAM 14 used as a working area and a ROM 13 for storing motor-control-table information and a motor-control program, described later, which is read and executed by the MPU 10 are also provided. Pulse-width-modulator (PWM) units 16 and 18 are connected to an MPU bus 11 and output pulse signals at specified output frequencies and specified duty cycles under the control of the MPU 10.

Pulses output from the PWM unit 16 are converted to a voltage by an integrating circuit formed of a resistor R11 and a capacitor C11 and input to the target-current setting terminal (same as the terminal IA shown in FIG. 3) of the motor driving circuit 21 to control the phase-A winding current of the stepper motor 30. In the same way, pulses output from the PWM unit 18 are converted to a voltage by an integrating circuit formed of a resistor R21 and a capacitor C21 and input to the target-current setting terminal (same as the terminal IB shown in FIG. 3) of the motor driving circuit 22 to control the phase-B winding current of the stepper motor 30.

An input and output port 12 is connected to the MPU bus 11, and outputs phase-excitation-direction signals for the stepper motor 30 to the terminal A of the motor driving circuit 21 and to the terminal B of the motor driving circuit 22 in synchronization with a phase switching signal output from the MPU 10. A programmable timer 15 starts measuring the time by the control of the MPU 10 and sends an interruption or a control signal to the MPU 10 when a specified period elapses.

The MPU 10 generates excitation signals required for two-phase excitation driving of the stepper motor 30 and sends them from the input and output port 12 to PWM units 16 and 18, causing units 16 and 18 to output pulses in accordance with the data in the tables shown in FIG. 7. These excitation signals are switched according to the time measurement of the timer 15 under the software control of the MPU 10. The target current is changed in synchronization with the timing when the excitation phase is switched, to control the operations of the stepper motor 30, such as the acceleration operation, the constant-speed operation, the deceleration operation, and the very-low-speed operation.

The motor-control-table information stored in advance in the ROM 13 will be described next by referring to FIG. 7. A control table is prepared for each desired motor operation. The MPU 10 reads desired data, and specifies the period of time in the timer 15 in accordance with the read data and information required for generating PWM pulses having the duty cycles corresponding to desired target currents in the two PWM units 16 and 18, if necessary, according to a control program, described later.

The purpose and meaning of the information shown in FIG. 7 will be described next. In the present embodiment, the target current is switched at predetermined periods to achieve motor-rotation control such that the carriage 31 is moved by 1/60 inch in a desired direction by one-step driving of the stepper motor 30 and driving at one step of the stepper motor 30 divided by six is implemented. In the present specification, one step divided by six is called one microstep.

A parameter N1 suppresses the target current near the start of acceleration. When the parameter N1 is zero, the maximum target current is not switched near the start of the acceleration zone. When the parameter N1 is not zero, the acceleration operation starts using a low-target-current table for acceleration (described later) specifying the time period for switching the excitation signals to suppress the maximum target current at the start of the acceleration operation, and the table used is switched to a normal-target-current table for acceleration (described later) when N1-microstep driving is achieved after the start of the acceleration operation to accelerate the motor at the normal winding current.

A parameter N2 suppresses the target current near the end of deceleration. When the parameter N2 is zero, the maximum target current is not switched near the end of the deceleration zone. When the parameter N2 is not zero, the motor is decelerated at the normal winding current by the use of a normal-target-current table for deceleration (described later) specifying the time period for switching the excitation signals at the start of the deceleration operation, and the table used is switched to a low-target-current table for deceleration (described later) when N2-microstep driving is achieved after the start of the deceleration operation to suppress the maximum target current near the end of the deceleration zone.

A parameter TH1 indicates a holding time before the start of an operation. Parameters PHA1 and PHB1 specify holding currents.

A parameter TH2 indicates a holding time at the end of an operation. Parameters PHA2 and PHB2 specify holding currents before the start of an operation.

The parameters PHA1 and PHA2 specify the phase-A-winding currents of the motor, and the parameters PHB1 and PHB2 specify the phase-B winding currents at the end of an operation.

Parameters T1011 to T1206 form an acceleration-time table in which an excitation time for each one-microstep driving in the acceleration operation is sequentially indicated. When 20 steps are used to accelerate the stepper motor, 120 (120=20×6) pieces of excitation-time information are specified. The last piece (T1206 in the figure) of excitation-time information in the acceleration-time table is also used as the excitation time for each one-microstep driving in the constant-speed operation.

Parameters T2011 to T2206 form a deceleration-time table in which an excitation time for each one-microstep driving in the deceleration operation is sequentially indicated. When 20 steps are used to decelerate the stepper motor, 120 (120=20×6) pieces of excitation-time information are specified. Parameters PnA01 to PnA12 and PnB01 to PnB12 (n=1, 2, 3, 4, 5) specify the target current and form target-current tables. The parameters PnA01 to PnA12 control the phase-A winding current of the motor, and the parameters PnB01 to PnB12 control the phase-B winding current.

The parameters P1A01 to P1A12 and P1B01 to P1B12 form the low-target-current table for acceleration, used for suppressing the maximum target current near the start of the acceleration zone.

The parameters P2A01 to P2A12 and P2B01 to P2B12 form the normal-target-current table for acceleration, used for the normal acceleration operation.

The parameters P3A01 to P3A12 and P3B01 to P3B12 form the constant-speed target-current table, used for the constant-speed operation.

The parameters P4A01 to P4A12 and P4B01 to P4B12 form the normal-target-current table for deceleration, used for the normal deceleration operation.

The parameters P5A01 to P5A12 and P5B01 to P5B12 form the low-target-current table for deceleration, used for suppressing the maximum target current near the end of the deceleration zone.

Among the above target-current tables, those which are not required for an operation to be achieved are not prepared. For the normal printing operation formed of the zones "a" to "e," for example, the above low-target-current table for acceleration or the low-target-current table for deceleration is not prepared.

At the start of an operation, the reading start position of a target-current table and the A and B outputs of the input and output port 12 are determined by the relationship indicted in the following Table 1 according to the start position of the stepper motor.

TABLE 1

| | MOTOR STOP (DRIVING START) POSITION | | | |
|---|---|---|---|---|
| | 4N | 4N + 1 | 4N + 2 | 4N + 3 |
| FORWARD ROTATION | | | | |
| PHASE A | PnA01 OUTPUT A = H | PnA07 OUTPUT A = H | PnA01 OUTPUT A = L | PnA07 OUTPUT A = L |
| PHASE B | PnB01 OUTPUT B = H | PnB07 OUTPUT B = H | PnB01 OUTPUT B = L | PnB07 OUTPUT B = L |
| BACKWARD ROTATION | | | | |
| PHASE A | PnA01 OUTPUT A = H | PnA07 OUTPUT A = H | PnA01 OUTPUT A = L | PnA07 OUTPUT A = L |
| PHASE B | PnB01 OUTPUT B = H | PnB07 OUTPUT B = H | PnB01 OUTPUT B = L | PnB07 OUTPUT B = L |

Where N = 1, 2, 3, 4, and 5

Target-current parameters are read for each one-microstep driving operation and the PWM units 16 and 18 are set to control currents flowing through the windings. Control is achieved such that, when the parameter PnA12 has been read, the parameter PnA01 is to be read next time, and when the parameter PnB12 has been read, the parameter PnB01 is to be read next time. The maximum target current is specified by the maximum value of each table. A half of each table is formed by twelve values, each 15 degrees apart, on a numerical function corresponding to a positive, semi-circular part (180 degrees) of a sine wave between the maximum value and zero, the twelve values being sequentially arranged. The other half of each table is formed by twelve values, each 15 degrees apart, on a numerical curve corresponding to the absolute values of the sine wave whose phase is 90 degrees from that of the above sine wave, the twelve values being sequentially arranged.

The target-current table is switched in each operation zone such that the reading positions continue, namely, the lower two figures of the parameters are continuously changed. Thus, when the parameters P1A04 and P1B04 are read from the low-target-current table for acceleration in the current operation, the next reading positions are changed to the parameter P2A05 and P2B05 when the table is switched to the normal-target-current table for acceleration.

The physical arrangement and sequence of the parameters of each piece of the motor-control-table information described above are just one example. The present invention can also be applied to cases in which other arrangements and sequences of the parameters are used. In the present embodiment, the motor-control-table information is stored in the ROM. The present invention can be easily applied to a case in which necessary information is stored in a storage device such as a RAM.

In the present embodiment, one microstep corresponds to one sixth of one step of the stepper motor. But one microstep may also be one third or half the one step. In this case, the number of parameters per one-step driving in each of the acceleration-time table, the deceleration-time table, and the target-current tables needs to match that of these divisions.

In the present embodiment, the PWM units and the integrating circuits specify the target currents. But it is also within the scope of the invention that a digital-analog converter is used to control the voltage output according to the target current.

Figure 8A:
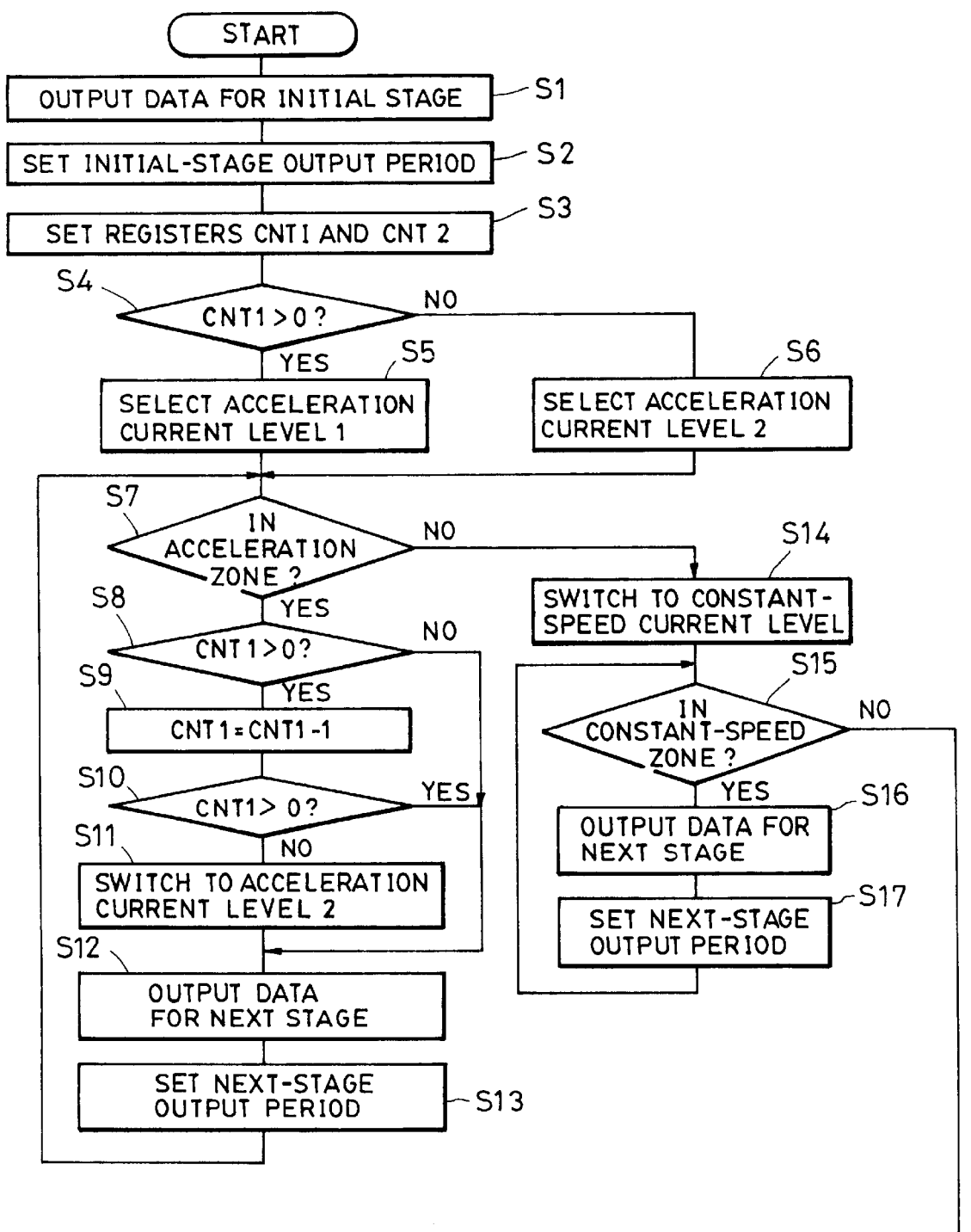
FIG. 8 shows the relationship between FIGS. 8A and 8B and FIGS. 8A and 8B are flowcharts of the processing steps executed by the motor control circuit shown in FIG. 6.
Figure 9:
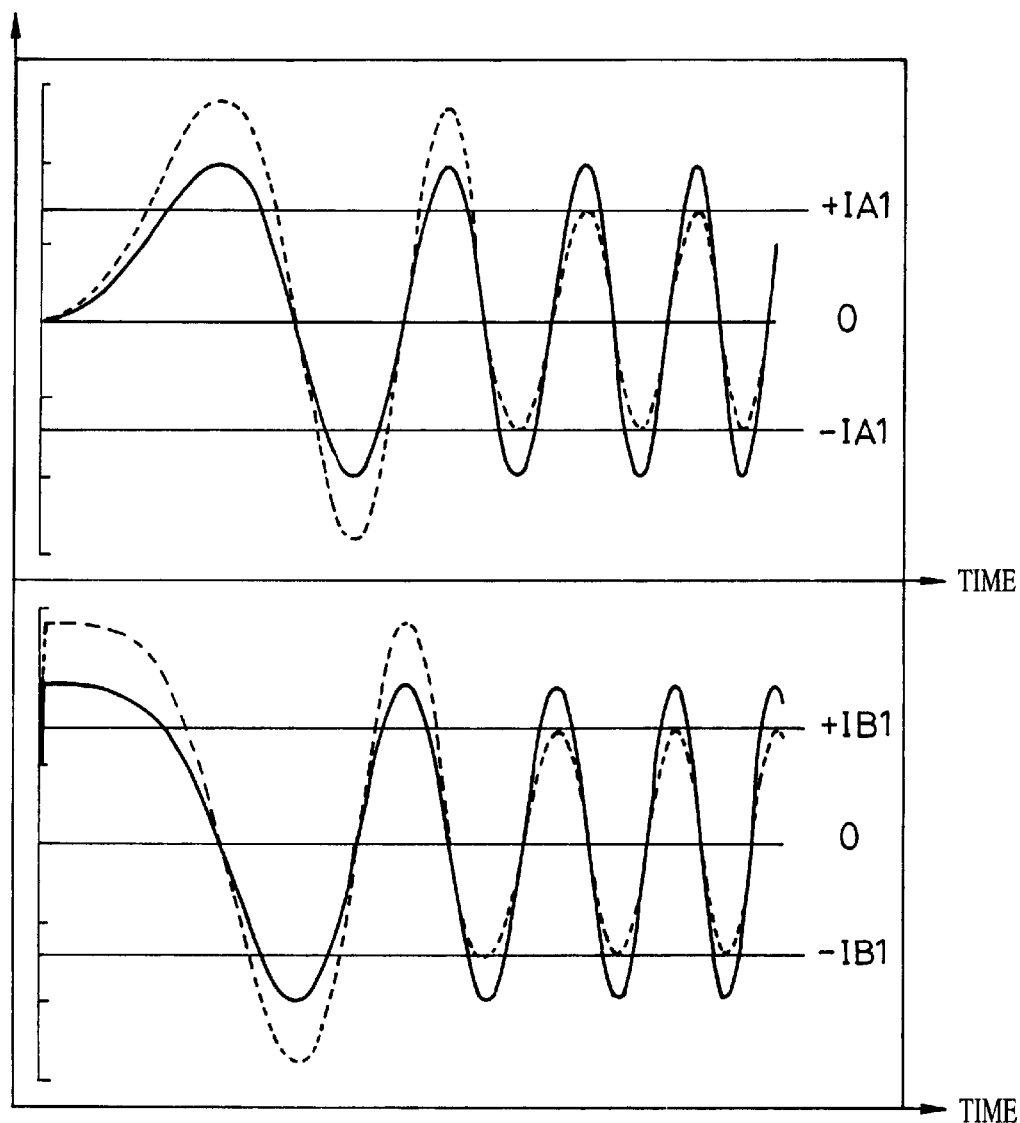
FIG. 9 is a graph of current supplied to the motor over time showing motor driving control achieved near the start of an acceleration zone in a conventional method.
Figure 10:
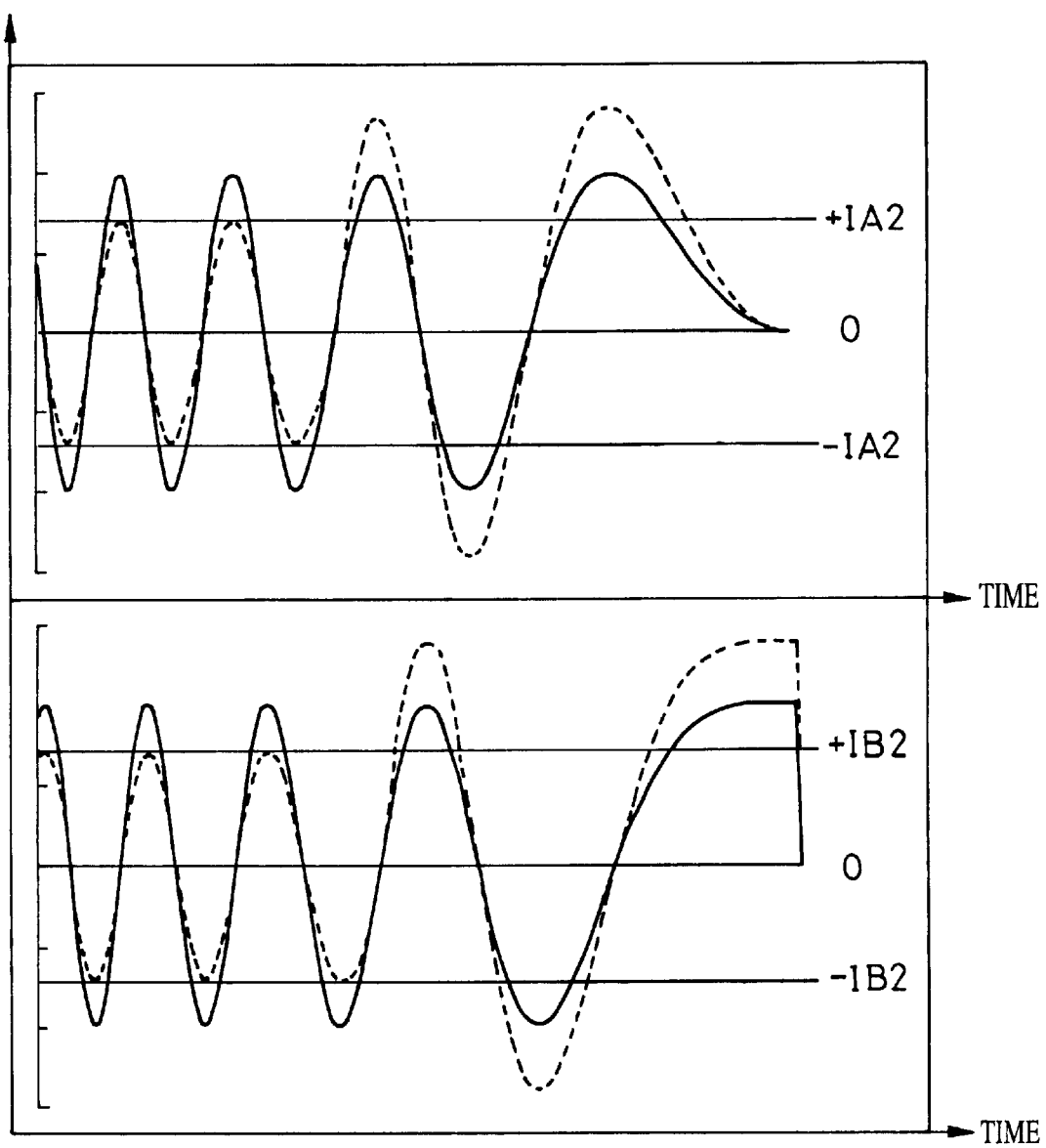
FIG. 10 is a graph of current supplied to the motor over time showing motor driving control achieved near the end of a deceleration zone in the conventional method.

FIG. 8 is a flowchart showing motor control processing executed by the motor control circuit shown in FIG. 6. A control program for executing this processing is stored in the ROM of the MPU.

When the rotation of the motor is instructed, the A and B outputs of the input and output port 12 are set to predetermined levels and desired winding currents flow through the phase-A and phase-B windings of the motor according to the parameters PHA1 and PHB1 described by referring to FIG. 7, such that the stepper motor 30 is held and excited at the driving-start step position, in a step S1.

Next, in a step S2, the timer is set to the parameter TH1 shown in FIG. 7 to generate a desired holding period. In the next step S3, the parameters N1 and N2 shown in FIG. 7 are read and stored in registers CNT1 and CNT2 disposed in a working area of the RAM 14, respectively, When a timer interruption occurs at the termination of the holding period, the processing proceeds to a step S4. A target-current selection for the start of acceleration is determined. When the stored value of the register CNT1 is larger than 0, the low-target-current table for acceleration, i.e., acceleration current level 1, is used to suppress the winding currents near the start of acceleration in a step S5. When the stored value of the register CNT1 is zero, the normal-target-current table for acceleration, i.e., acceleration current level 2, is used to set the target winding currents in a step S6. In either of the steps S5 and S6, the target-current table is selected, the parameters for first-one-microstep control are read from the selected table, the PWM units 16 and 18 are operated according to the parameters, and the timer 15 is set to the first period specified in the acceleration-time table.

When the set period elapses, the processing proceeds to a step S7 which determines whether the motor is in the acceleration zone. Since the operation is being performed in the acceleration zone, the processing proceeds to a step S8, which determines whether the stored value of the register CNT1 is larger than 0. If it is, for example because the driving is being performed with the low-target-current table for acceleration, the stored value of the register CNT1 is decremented by one in a step S9. Then, the value of the register CNT1 is again checked in a step S10 to determine whether a driving zone located near the start of acceleration has been finished. When the value of the register CNT1 becomes zero as a result of the step S9, this means that the driving zone located near the start of acceleration has been finished. As a result, the method proceeds to a step S11, where the reading position of the target-current table is changed as described above so that the normal-target-current table for acceleration is referenced by switching to acceleration current level 2.

When the value of the register CNT1 is determined to be zero in the step S8, since the normal-target-current table for acceleration has already been referenced, the processing proceeds to a step S12. When the value of the register CNT1 is determined to be larger than zero in the step S10, since driving according to the low-target-current table for acceleration is extended, the processing also proceeds to the step S12. And when step 11 is completed, processing proceeds to step S12.

In the step S12, the target-current table is read, the PWM units are set, and if necessary, the A and B outputs of the input and output port 12 are changed in order to drive the stepper motor to the next microstep position. In a step S13, the next. time data is read from the acceleration-time table and is set in the timer. Every time when the time set in the timer elapses, the processes from the step S7 to the step S13 are repeated until driving is finished in a desired acceleration zone. When driving is finished in the desired acceleration zone, the processing proceeds from the step S7 to a step S14. If constant-speed driving is required, the table is switched to the constant-speed target-current table in the step S14. Next, step S15 determines whether the motor is in the constant-speed zone. When step S15 determines that driving is in the constant-speed zone, the target-current table is read, the PWM units are set, and if necessary, the A and B outputs of the input and output port 12 are changed in order to drive the stepper motor to the next microstep position, in a step S16. In a step S17, the same time as that specified at the end of the acceleration zone is set in the timer.

Every time when the time set in the timer elapses, the processes from the step S15 to the step S17 are repeated until driving is finished in the constant-speed zone. Step S15 determines that the driving is not in the constant-speed zone, for example, when driving is finished in the constant-speed zone, or when constant-speed driving is not required from the beginning, the processing proceeds to a step S18 to start deceleration control by selecting deceleration current level 1. The target-current table is switched to the normal-target-current table for deceleration to set the target current required at the start of deceleration, and the deceleration-time table is also specified.

Step S19 determines whether the driving is in the deceleration zone. When step S19 determines that the driving is in a deceleration zone, the processing proceeds to a step S20, which determines whether CNT2 is greater than zero. When the value of the register CNT2 stored in the step S3 is determined to be larger than zero, in step S20, since driving is being achieved with the normal-target-current table for deceleration and the winding currents need to be suppressed near the end of the deceleration zone, the value of the register CNT2 is decremented by 1 in a step S21. In a step S22, the value of the register CNT2 is again checked as to whether CNT is greater than zero to determine whether a driving zone located near the end of the deceleration zone has been reached.

When the value of the register CNT2 is determined to become zero in step S22 as a result of the step S21, driving has reached a desired point, which is near the end of the deceleration zone. The reading position of the target-current table is then changed in a step S23 to a deceleration current level 2 so that the low-target-current table for deceleration is referenced. When the value of the register CNT2 is determined to be zero in the step S20, since the target-current table does not need to be changed, the processing proceeds to a step S24. In the step S24, the target-current table is read, the PWM units are set, and if necessary, the A and B outputs of the input and output port 12 are changed in order to drive the stepper motor to the next microstep position.

In a step S25, the next time data is read from the deceleration-time table and set in the timer. Every time when the time set in the timer elapses, the processes from the step S19 to the step S25 are repeated until driving is finished in a desired deceleration zone.

When step S19 determines that the driving is finished in the deceleration zone, the processing proceeds to a step S26. In this step, the A and B outputs of the input and output port 12 are set to predetermined levels and desired winding currents flow through the phase-A and phase-B windings of the motor according to the parameters PHA2 and PHB2 described by referring to FIG. 7 such that the stepper motor 30 is held and excited at the driving-end step position.

Next, in a step S27, the timer is set to the parameter TH2 shown in FIG. 7 to generate a desired holding period. When a timer interruption occurs at the termination of the holding period, the motor-control-processing program is terminated.

The present invention may be applied to a system formed of a plurality of units or to an apparatus formed of one unit. The present invention can also be applied to a case in which a control program which executes the processing specified by the present invention is sent to a system or an apparatus and the processing is achieved.

As described above, according to the present invention, the maximum target current is reduced near the start of the acceleration zone and near the end of the deceleration zone to drive the stepper motor at the minimum required winding current. Unlike a conventional apparatus, a winding current more than necessary is not supplied near the start of acceleration or near the end of deceleration, a power supply for driving the motor needs to be designed so that its rating (capacity) covers the maximum practical current, and thereby the cost of the power supply is decreased.

In addition, since a winding current more than necessary is not supplied near the start of acceleration or near the end of deceleration, the motor is driven at a high speed with a low cost, and a motor control apparatus drives the motor with low noise and with wasteful motor heat being suppressed.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:
1. A motor control apparatus comprising:
   a stepper motor;
   driving means for driving said stepper motor;
   excitation-signal generation means for applying an excitation signal to said driving means to drive said stepper motor when the excitation signal is switched;
   a timer for measuring a predetermined period of time at the end of which the excitation signal is switched;
   pulse generation means for applying a pulse signal having a specified duty cycle to said driving means to control the driving current of said stepper motor;
   storage means for storing motor-control-table information for various driving modes of said stepper motor including at least an acceleration mode and a deceleration mode; and
   control means for specifying for said pulse generation means information required for generating a pulse signal having a duty cycle specified according to the motor-control-table information of a driving mode, the information including information used by said driving means to suppress the driving current of said stepper motor near the start of the acceleration mode and near the end of the deceleration mode, and for controlling said timer to start measuring the predetermined period of time and for controlling said excitation-signal generation means to switch the excitation signal at the end of the measured predetermined period of time.

2. A motor control apparatus according to claim 1, wherein, among the driving modes for which the motor-control-table information is stored in said storage means, the acceleration mode has a current-suppression table for acceleration and a normal table for acceleration, and the deceleration mode has a current-suppression table for deceleration and a normal table for deceleration.

3. A motor control apparatus according to claim 1, wherein said control means makes said timer start measuring the predetermined period of time and controls said driving means to drive said stepping motor according to the various driving modes for which the motor-control-table information is stored in said storage means, according to the time measured by said timer.

4. A motor control apparatus according to claim 3, wherein said control means controls said driving means to drive said stepping motor according to the driving modes in synchronization with the timing when the excitation signal is switched.

5. A motor control apparatus comprising:

a stepper motor;

driving means for driving said stepper motor with a driving current;

excitation-signal generation means for applying an excitation signal to said driving means to drive said stepper motor when the excitation signal is switched;

pulse generation means for applying a pulse signal having a specified duty cycle to said driving means to control the driving current of said stepper motor;

storage means for storing motor-control-table information for various driving modes of said stepper motor including at least an acceleration mode, and a deceleration mode; and control means for specifying for said pulse generation means information required for generating a pulse signal having a duty cycle specified according to the motor control-table information of a driving mode, the information including information used by said driving means for suppressing the driving current of said stepper motor near the start of the acceleration mode and near the end of the deceleration mode, and for controlling said excitation-signal generation means to switch the excitation signal.

6. A motor control apparatus according claim 5, wherein said stepper motor comprises means for providing a driving source of a carriage control mechanism of a printer.

7. A motor control apparatus according to claim 6, wherein said stepper motor comprises means for providing high-speed printing for the carriage control mechanism.

8. A motor control apparatus comprising:

a motor;

driving means for driving said motor with a driving current;

excitation-signal generation means for applying an excitation signal to said driving means to drive said motor when the excitation signal is switched;

specifying means for specifying the driving current supplied to said motor by said driving means;

storage means for storing motor-control-table information for various driving modes of said motor including at least an acceleration mode and a deceleration mode; and control means for controlling said specifying means to specify the driving current according to the motor-control-table information of a driving mode, for specifying information used by said driving means for suppressing the driving current of the motor near the start of the acceleration mode and near the end of the deceleration mode, and for controlling said excitation-signal generation means to switch the excitation signal.

9. A motor control apparatus comprising:

a stepper motor;

driving means for driving said stepper motor with a driving current;

excitation-signal generation means for applying an excitation signal to said driving means to drive said stepper motor when the excitation signal is switched;

specifying means for specifying the driving current supplied to said stepper motor by said driving means;

storage means for storing motor-control-table information in a motor control table for various driving modes of said stepper motor including at least an acceleration mode and a deceleration mode; and control means for controlling said specifying means to specify the driving current according to the motor-control-table information of a driving mode, and for controlling said excitation-signal generation means to switch the excitation signal, wherein the motor control table includes information used by said control means to control said specifying means to specify a driving current corresponding to at least N microsteps within one step driving of said stepper motor, wherein N is a positive integer;

wherein the motor control table includes a current-suppression table for acceleration in the acceleration mode and a normal table for acceleration in the acceleration mode, and wherein the motor control table includes a current-suppression table for deceleration in the deceleration mode and a normal table for deceleration in the deceleration mode;

wherein said control means controls said specifying means to specify the driving current according to the current-suppression table for acceleration at the start of the acceleration mode;

wherein said control means switches the motor control table used for controlling said specifying means after counting the number of microsteps during acceleration;

wherein said control means controls said specifying means to specify the driving current according to the normal table for acceleration;

wherein said control means controls said specifying means to specify the driving current according to the normal table for deceleration at the start of the deceleration mode;

wherein said control means switches the motor control table used for controlling said specifying means after counting the number of microsteps during deceleration; and wherein said control means controls said specifying means to specify the driving current according to the current-suppression table for deceleration.

10. A motor control apparatus comprising:

a stepper motor capable of operating in an acceleration mode and a deceleration mode;

driving means for driving said stepper motor with a driving current;

excitation-signal generation means for applying an excitation signal to said driving means to drive said stepper motor when the excitation signal is switched;

specifying means for specifying the driving current supplied to said stepper motor by said driving means; and control means for controlling said specifying means to specify the driving current according to a driving mode of said stepper motor, and for controlling said excitation-signal generation means to switch the excitation signal, wherein said control means controls said specifying means so as to suppress the driving current of said stepper motor near the start of an acceleration mode and near the end of a deceleration mode.

11. A motor control apparatus for outputting an excitation signal to a stepper motor to drive the stepper motor in driving modes including an acceleration mode and a deceleration mode, comprising:

means for specifying a driving current of the stepper motor according to each driving mode;

determination means for determining the driving mode of the stepper motor; and means for suppressing the driving current near the start of the acceleration mode and near the end of the deceleration mode in response to the measuring of the elapse of a predetermined time.

12. A motor control apparatus for outputting an excitation signal of a stepper motor to drive the stepper motor in driving modes including an acceleration mode and a deceleration mode, comprising:

means for specifying a driving current of the motor according to each driving mode;

determination means for determining the driving mode of the stepper motor;

stepper-motor driving means for driving the stepper motor according to a microstep driving method driving the stepper motor in microsteps within one step driving of the stepper motor, said stepper-motor driving means comprising means for specifying the driving current of the stepper motor at least N times within one step driving of the stepper motor, wherein N is a positive integer;

means for counting the number of microsteps of the stepper motor during the acceleration mode from the start of the acceleration mode;

means for counting the number of microsteps of the stepper motor during the deceleration mode from the start of the deceleration mode;

means for achieving driving of the stepping motor at a first maximum target driving current or less at the start of the acceleration mode;

means for switching the driving of the stepping motor to a second maximum target driving current or less after the number of microsteps performed during the acceleration mode reaches a predetermined number;

means for achieving driving of the stepping motor at a third maximum target driving current or less at the start of the deceleration mode; and means for switching the driving of the stepping motor to a fourth maximum target driving current or less after the number of microsteps performed during the deceleration mode reaches a predetermined number.

13. A motor control apparatus according to claim 12, further comprising:

timer measuring means for measuring a predetermined period of time at the end of which the driving of the stepper motor is switched;

means for selecting motor-driving control information including time information of the predetermined time measured by the timer measuring means and target driving current information for each microstep driving, according to a target driving speed, wherein the motor-driving control information is stored in a memory; and means for sequentially reading the time information from said memory to set it for said timer measuring means and for reading the target driving current information from said memory to achieve motor driving control with said two switching means and said two achieving means using the read target driving current information, wherein the motor-driving control information includes microstep information used in the acceleration mode by said first-maximum-target-driving-current achieving means until the maximum target current is switched by said second-maximum-target-driving-current switching means, and wherein the motor-driving control information includes microstep information used in the deceleration mode by said third-maximum-target-driving-current achieving means until the maximum target current is switched by said fourth-maximum-target-driving-current switching means.

14. A motor control apparatus for outputting an excitation signal to a stepper motor to drive the stepper motor in driving modes including an acceleration mode and a deceleration mode, comprising:

means for specifying a driving current of the stepper motor;

determination means for determining the driving mode of the stepper motor;

first target-current specifying means for specifying a target current corresponding to a motor winding current near the start of the acceleration mode and near the end of the deceleration mode in response to the measuring of the elapse of a predetermined time; and second target-current specifying means for specifying a target current more than the motor winding current near the start of the acceleration mode and near the end of the deceleration mode in response to the measuring of the elapse of a predetermined time.

15. A motor control apparatus comprising:

a stepper motor;

a motor driving circuit, connected to said stepper motor and driving said stepper motor;

an excitation-signal generation circuit, connected to said motor driving circuit and applying an excitation signal to said motor driving circuit to drive said stepper motor when the excitation signal is switched;

a timer circuit, connected to said excitation signal generation circuit and measuring a predetermined period of time at the end of which the excitation signal is switched;

a pulse modulator unit, connected to said motor driving circuit and applying a pulse signal having a specified duty cycle to said motor driving circuit to control the driving current of said stepper motor;

a memory storing motor-control-table information for various driving modes of said stepper motor including at least an acceleration mode and a deceleration mode; and a processor, connected to said memory, said pulse modulator circuit, said timer circuit, and said excitation-signal generation circuit, said processor specifying for said pulse modulator unit information required for generating a pulse signal having a duty cycle specified according to the motor-control-table information of a driving mode, the information including information used by said motor driving circuit to suppress the driving current of said stepper motor near the start of the acceleration mode and near the end of the deceleration mode, said processor controlling said timer to start measuring the predetermined period of time, said processor controlling said excitation-signal generation circuit to switch the excitation signal at the end of the measured predetermined period of time.

16. A motor control apparatus according to claim 15, wherein, among the driving modes for which the motor-control-table information is stored in said memory, the acceleration mode has a current-suppression table for acceleration and a normal table for acceleration, and the deceleration mode has a current-suppression table for deceleration and a normal table for deceleration.

17. A motor control apparatus according to claim 15, wherein said processor makes said timer circuit start measuring the predetermined period of time and controls said motor driving circuit to drive said stepping motor according to the various driving modes for which the motor-control-table information is stored in said memory, according to the time measured by said timer circuit.

18. A motor control apparatus according to claim 17, wherein said processor controls said driving circuit to drive said stepping motor according to the driving modes in synchronization with the timing when the excitation signal is switched.

19. A motor control apparatus comprising:

a stepper motor;

a motor driving circuit connected to said stepper motor and driving said stepper motor with a driving current;

an excitation-signal generation circuit connected to said motor driving circuit and applying an excitation signal to said motor driving circuit to drive said stepper motor when the excitation signal is switched;

a pulse modulator unit connected to said motor driving circuit and applying a pulse signal having a specified duty cycle to said motor driving circuit to control the driving current of said stepper motor;

a memory storing motor-control-table information for various driving modes of said stepper motor including at least an acceleration mode, and a deceleration mode; and a processor connected to said memory, said pulse modulator unit, said excitation-signal generation unit, and said motor driving unit, said processor specifying for said pulse modulator unit information required for generating a pulse signal having a duty cycle specified according to the motor control-table information of a driving mode, the information including information used by said motor driving circuit for suppressing the driving current of said stepper motor near the start of the acceleration mode and near the end of the deceleration mode, and said processor controlling said excitation-signal generation circuit to switch the excitation signal.

20. A motor control apparatus according claim 19, wherein said stepper motor provides a driving source of a carriage control mechanism of a printer.

21. A motor control apparatus according to claim 20, wherein said stepper motor provides high-speed printing for the carriage control mechanism.

22. A motor control apparatus comprising:

a motor;

a motor driving circuit connected to said motor and driving said motor with a driving current;

an excitation-signal generation circuit connected to said motor driving circuit and applying an excitation signal to said motor driving circuit to drive said motor when the excitation signal is switched;

a modulator unit connected to said motor driving circuit and specifying the driving current supplied to said motor by said motor driving circuit;

a memory storing motor-control-table information for various driving modes of said motor including at least an acceleration mode and a deceleration mode; and a processor connected to said memory, said modulator unit, said excitation-signal generation circuit, and said motor driving circuit and controlling said modulator unit to specify the driving current according to the motor-control-table information of a driving mode, said processor specifying information used by said motor driving circuit for suppressing the driving current of the motor near the start of the acceleration mode and near the end of the deceleration mode, and said processor controlling said excitation-signal generation circuit to switch the excitation signal.

23. A motor control apparatus comprising:

a stepper motor;

a motor driving circuit connected to said stepper motor and driving said stepper motor with a driving current;

an excitation-signal generation circuit connected to said motor driving circuit and applying an excitation signal to said motor driving circuit to drive said stepper motor when the excitation signal is switched;

a modulator unit connected to said motor driving circuit and specifying the driving current supplied to said stepper motor by said motor driving circuit;

a memory storing motor-control-table information in a motor control table for various driving modes of said stepper motor including at least an acceleration mode and a deceleration mode; and a processor connected to said memory, said modulator unit, said excitation-signal generation circuit, and said motor driving circuit and controlling said modulator unit to specify the driving current according to the motor-control-table information of a driving mode, said processor controlling said excitation-signal generation circuit to switch the excitation signal, wherein the motor control table includes information used by said processor to control said modulator unit to specify a driving current corresponding to at least N microsteps within one step driving of said stepper motor, wherein N is a positive integer;

wherein the motor control table includes a current-suppression table for acceleration in the acceleration mode and a normal table for acceleration in the acceleration mode, and wherein the motor control table includes a current-suppression table for deceleration in the deceleration mode and a normal table for deceleration in the deceleration mode;

said processor controlling said modulator unit to specify the driving current according to the current-suppression table for acceleration at the start of the acceleration mode;

said processor switching the motor control table used for controlling said modulator unit after counting the number of microsteps during acceleration;

said processor controlling said modulator unit to specify the driving current according to the normal table for acceleration;

said processor controlling said modulator unit to specify the driving current according to the normal table for deceleration at the start of the deceleration mode;

said processor switching the motor control table used for controlling said modulator unit after counting the number of microsteps during deceleration; and said processor controlling said modulator unit to specify the driving current according to the current-suppression table for deceleration.

24. A motor control apparatus comprising:

a stepper motor capable of operating in an acceleration mode and a deceleration mode;

a motor driving circuit connected to said stepper motor and driving said stepper motor with a driving current;

an excitation-signal generation circuit connected to said motor driving circuit and applying an excitation signal to said motor driving circuit to drive said stepper motor when the excitation signal is switched;

a modulator unit connected to said motor driving circuit and specifying the driving current supplied to said stepper motor by said motor driving circuit; and a processor connected to said modulator unit, said excitation-signal generation circuit, and said motor driving circuit and controlling said modulator unit to specify the driving current according to a driving mode of said stepper motor, said processor controlling said excitation-signal generation unit to switch the excitation signal, said processor controlling said modulator unit so as to suppress the driving current of said stepper motor near the start of an acceleration mode and near the end of a deceleration mode.

25. A method of controlling a stepper motor to be driven in an acceleration mode and a deceleration mode comprising the steps of:

specifying the duty cycle of a pulse signal suppressing the driving current of the stepper motor near the start of the acceleration mode or the end of the deceleration mode in accordance with stored motor control table information;

measuring a predetermined time from the start of the duty cycle of the pulse signal suppressing the driving current to the stepper motor near the start of the acceleration mode or the end of the deceleration mode in accordance with stored motor control table information;

switching an excitation signal at the end of the predetermined period of time measured in said measuring step; and specifying a new duty cycle for a pulse signal to change the driving current of the stepper motor when the excitation signal is switched in said switching step in accordance with stored motor control table information.

26. A method according to claim 25, wherein said first specifying step specifies the duty cycle of the pulse signal suppressing the driving current of the stepping motor near the start of the acceleration mode in accordance with a stored current-suppression table for acceleration, wherein said first specifying step specifies the duty cycle of the pulse signal suppressing the driving current of the stepping motor near the end of the deceleration mode in accordance with a stored current-suppression table for deceleration, wherein said second specifying step specifies a new duty cycle of the pulse signal to change the driving current of the stepper motor in the acceleration mode in accordance with a stored normal table for acceleration, and wherein said second specifying step specifies a new duty cycle of the pulse signal to change the driving current of the stepper motor in the deceleration mode in accordance with a stored normal table for deceleration.

27. A method according to claim 25, further comprising the step of controlling a driving circuit to drive the stepper motor with a driving current in accordance with the pulse signal whose duty cycle is specified in said specifying steps and in accordance with the time measured in said measuring step.

28. A method according to claim 27, wherein said controlling step controls the driving circuit to drive the stepping motor according to the driving modes in synchronization with the timing measured in said measuring step when the excitation signal is switched in said switching step.

29. A method of controlling a stepper motor to be driven in an acceleration mode, and a deceleration mode comprising the steps of:

specifying the duty cycle of a pulse signal determining the driving current of the stepper motor in the acceleration mode, and the deceleration mode in accordance with stored motor control table information;

specifying the duty cycle of a pulse signal suppressing the driving current of the stepper motor near the start of the acceleration mode or the end of the deceleration mode in accordance with stored motor control table information and to the measuring of the elapse of a predetermined time;

switching an excitation signal; and specifying a new duty cycle for a pulse signal to change the driving current of the stepper motor when the excitation signal is switched in said switching step in accordance with stored motor control table information.

30. A method according to claim 29, further comprising the step of driving a carriage control mechanism of a printer with the stepper motor.

31. A motor control apparatus according to claim 30, further comprising the step of driving the carriage control mechanism to control the printer to perform high-speed printing with the stepper motor.

32. A method of controlling a motor to be driven in at least an acceleration mode and a deceleration mode comprising the steps of:

specifying the driving current of the motor in the acceleration mode and the deceleration mode in accordance with stored motor control table information;

suppressing the driving current of the motor near the start of the acceleration mode or the end of the deceleration mode in accordance with stored motor control table information and to the measuring of the elapse of a predetermined time;

switching an excitation signal; and specifying a new driving current of the motor when the excitation signal is switched in said switching step in accordance with stored motor control table information.

33. A method of controlling a stepper motor to be driven in at least an acceleration mode and a deceleration mode in microsteps with one step, said method comprising the steps of:

specifying the driving current for the stepper motor according to a stored current-suppression table for acceleration at the start of the acceleration mode;

counting the number of microsteps performed by the stepper motor when being driven in the acceleration mode;

switching the table used for specifying the driving current from the current-suppression table for acceleration to the normal table for acceleration after the number of counted microsteps reaches a predetermined number during acceleration of the stepping motor in the acceleration mode;

specifying the driving current for the stepper motor according to the stored normal table for acceleration in the acceleration mode;

specifying the driving current for the stepper motor according to a normal table for deceleration at the start of the deceleration mode;

counting the number of microsteps performed by the stepper motor when being driven in the deceleration mode;

switching the table used for specifying the driving current from the normal table for deceleration in the deceleration mode to a current-suppression table for deceleration in the deceleration mode after the number of counted microsteps reaches a predetermined number during deceleration of the stepping motor in the deceleration mode; and specifying the driving current for the stepper motor according to the current-suppression table for deceleration at the start of the deceleration mode.

34. A method of controlling a stepper motor to be driven in at least an acceleration mode and a deceleration mode comprising the steps of:

specifying the driving current of the motor in accordance with the driving mode in which the stepper motor operates;

suppressing the driving current of the motor near the start of the acceleration mode and at the end of the deceleration mode in response to the measuring of the elapse of a predetermined time;

switching an excitation signal; and specifying a new driving current of the motor when the excitation signal is switched in said switching step after the driving current in the acceleration mode is suppressed in said suppressing step and when the driving current in the deceleration mode is suppressed in said suppressing step.

35. A motor control apparatus comprising:

a stepper motor capable of operating in an acceleration mode;

driving means for driving said stepper motor with a driving current;

excitation-signal generation means for applying an excitation signal to said driving means to drive said stepper motor when the excitation signal is switched;

specifying means for specifying the driving current supplied to said stepper motor by said driving means; and control means for controlling said specifying means to specify the driving current according to a driving mode of said stepper motor, and for controlling said excitation-signal generation means to switch the excitation signal, wherein said control means controls said specifying means so as to suppress the driving current of said stepper motor near the start of an acceleration mode.

36. A motor control apparatus comprising:

a stepper motor capable of operating in a deceleration mode;

driving means for driving said stepper motor with a driving current;

excitation-signal generation means for applying an excitation signal to said driving means to drive said stepper motor when the excitation signal is switched;

specifying means for specifying the driving current supplied to said stepper motor by said driving means; and control means for controlling said specifying means to specify the driving current according to a driving mode of said stepper motor, and for controlling said excitation-signal generation means to switch the excitation signal, wherein said control means controls said specifying means so as to suppress the driving current of said stepper motor near the end of a deceleration mode.

37. A motor control apparatus comprising:

a stepper motor capable of operating in acceleration mode;

a motor driving circuit connected to said stepper motor and driving said stepper motor with a driving current;

an excitation-signal generation circuit connected to said motor driving circuit and applying an excitation signal to said motor driving circuit to drive said stepper motor when the excitation signal is switched;

a modulator unit connected to said motor driving circuit and specifying the driving current supplied to said stepper motor by said motor driving circuit; and a processor connected to said modulator unit, said excitation-signal generation circuit, and said motor driving circuit and controlling said modulator unit to specify the driving current according to a driving mode of said stepper motor, said processor controlling said excitation-signal generation unit to switch the excitation signal, said processor controlling said modulator unit so as to suppress the driving current of said stepper motor near the start of an acceleration mode.

38. A motor control apparatus comprising:

a stepper motor capable of operating in an deceleration mode;

a motor driving circuit connected to said stepper motor and driving said stepper motor with a driving current;

an excitation-signal generation circuit connected to said motor driving circuit and applying an excitation signal to said motor driving circuit and applying an excitation signal to said motor driving circuit to drive said stepper motor when the excitation signal is switched;

a modulator unit connected to said motor driving circuit and specifying the driving current supplied to said stepper motor by said motor driving circuit; and a processor connected to said modulator unit, said excitation-signal generation circuit, and said motor driving circuit and controlling said modulator unit to specify the driving current according to a driving mode of said stepper motor, said processor controlling said excitation-signal generation unit to switch the excitation signal, said processor controlling said modulator unit so as to suppress the driving current of said stepper motor near the end of a deceleration mode.

* * * * *

UNITED STATES PATENT AND TRADEMARK OFFICE
CERTIFICATE OF CORRECTION

PATENT NO.     : 6,459,229 B1
DATED          : October 1, 2002
INVENTOR(S)    : Tetsuya Kawanabe It is certified that error appears in the above-identified patent and that said Letters Patent is hereby corrected as shown below:

Column 3,
Line 39, "motor" should read -- motor- --.

Column 11,
Line 41, "the" (2nd occurrence) should be deleted.

Column 18,
Lines 21 and 26, "PHAL" should read -- PHA1 --.

Column 23,
Line 45, "motor" should read -- motor- --.

Signed and Sealed this

Twentieth Day of May, 2003

JAMES E. ROGAN
*Director of the United States Patent and Trademark Office*